(12) United States Patent
Jung et al.

(10) Patent No.: US 12,704,215 B2
(45) Date of Patent: Aug. 11, 2026

(54) VACUUM ADIABATIC BODY AND METHOD FOR MANUFACTURING THE SAME

(71) Applicant: LG ELECTRONICS INC., Seoul (KR)

(72) Inventors: Wonyeong Jung, Seoul (KR); Deokhyun Youn, Seoul (KR); Duchan Ki, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 18/715,305

(22) PCT Filed: Dec. 1, 2022

(86) PCT No.: PCT/KR2022/019363

§ 371 (c)(1),
(2) Date: May 31, 2024

(87) PCT Pub. No.: WO2023/101467

PCT Pub. Date: Jun. 8, 2023

(65) Prior Publication Data

US 2025/0020264 A1 Jan. 16, 2025

(30) Foreign Application Priority Data

Dec. 3, 2021 (KR) ........................ 10-2021-0171921

(51) Int. Cl.
*F16L 59/065* (2006.01)
*F25D 23/06* (2006.01)

(52) U.S. Cl.
CPC ............ *F16L 59/065* (2013.01); *F25D 23/06* (2013.01); *F25D 2201/14* (2013.01)

(58) Field of Classification Search
CPC ..... F16L 59/065; F25D 23/06; F25D 2201/14
USPC .......................................................... 428/213
See application file for complete search history.

(56) References Cited

U.S. PATENT DOCUMENTS

| | | | |
|---|---|---|---|
| 2015/0270718 A1 | 9/2015 | Hwang | |
| 2018/0224197 A1 | 8/2018 | Jung et al. | |
| 2021/0140704 A1 | 5/2021 | Kim et al. | |
| 2025/0020264 A1* | 1/2025 | Jung | F25D 23/062 |

FOREIGN PATENT DOCUMENTS

| | | |
|---|---|---|
| EP | 3 910 269 A1 | 11/2021 |
| JP | H 05-066083 A | 3/1993 |
| JP | 2012-207682 A | 10/2012 |
| KR | 20-1999-0035652 U | 9/1999 |
| KR | 10-2015-0109722 A | 10/2015 |
| KR | 10-2015-0109724 A | 10/2015 |

(Continued)

OTHER PUBLICATIONS

JP 2012207682 A Machine Transilation (Year: 2012).*

(Continued)

*Primary Examiner* — Betelhem Shewareged
(74) *Attorney, Agent, or Firm* — KED & ASSOCIATES, LLP

(57) ABSTRACT

A vacuum adiabatic body of the present disclosure may include a first plate; a second plate; and a vacuum space provided between the first plate and the second plate. The vacuum adiabatic body may include a strength reinforcement portion configured to reinforce the strength of the first plate.

20 Claims, 22 Drawing Sheets

(56) References Cited

FOREIGN PATENT DOCUMENTS

| | | |
|---|---|---|
| KR | 10-2017-0016190 | 2/2017 |
| WO | WO 2021/006640 | 1/2021 |

OTHER PUBLICATIONS

Extended European Search Report dated Jan. 24, 2025 issued in Application No. 22901825.4.

International Search Report and Written Opinion dated Mar. 8, 2023 issued in Application No. PCT/KR2022/019363.

* cited by examiner

【Figure 1】
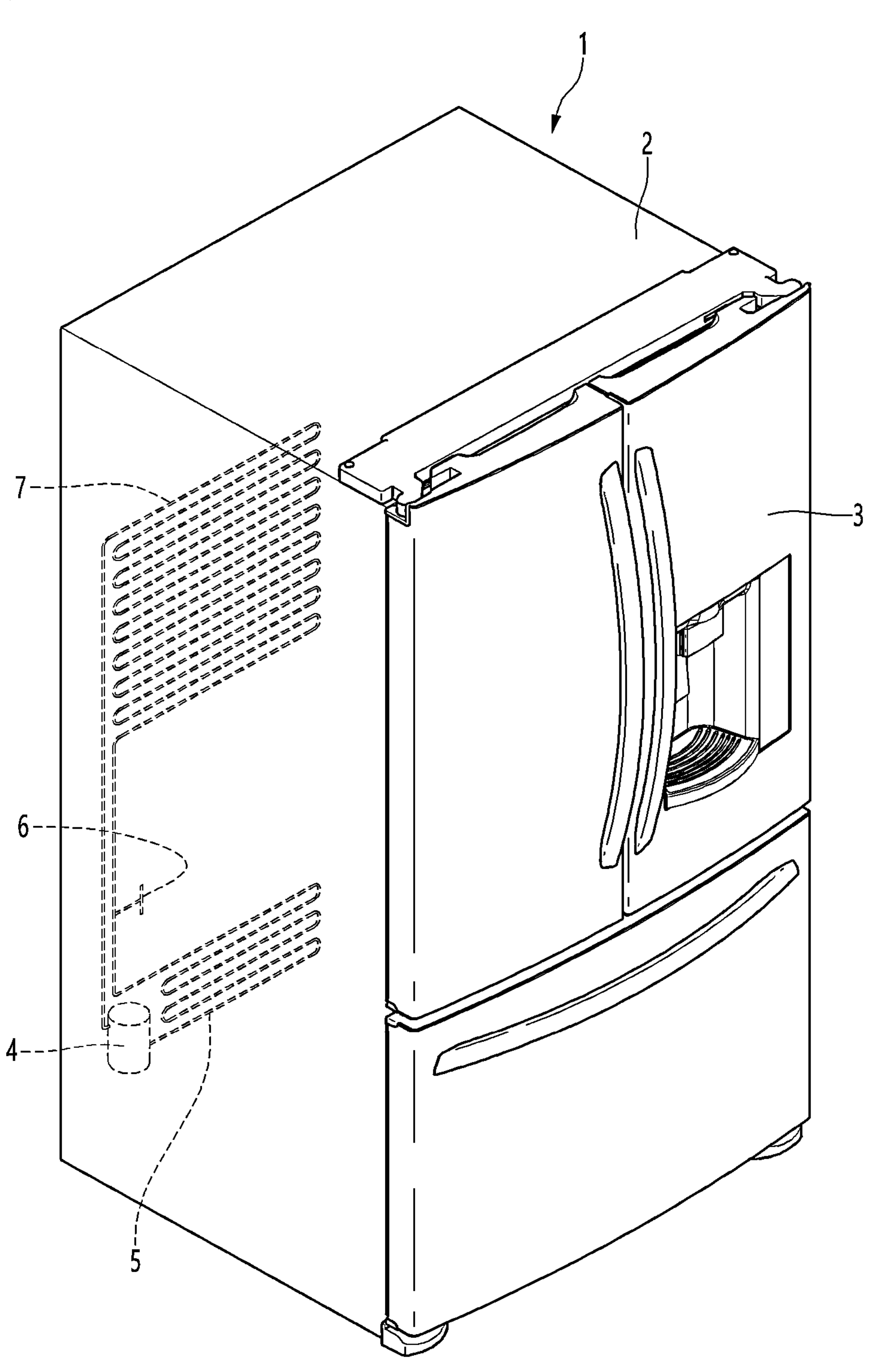

【Figure 2】
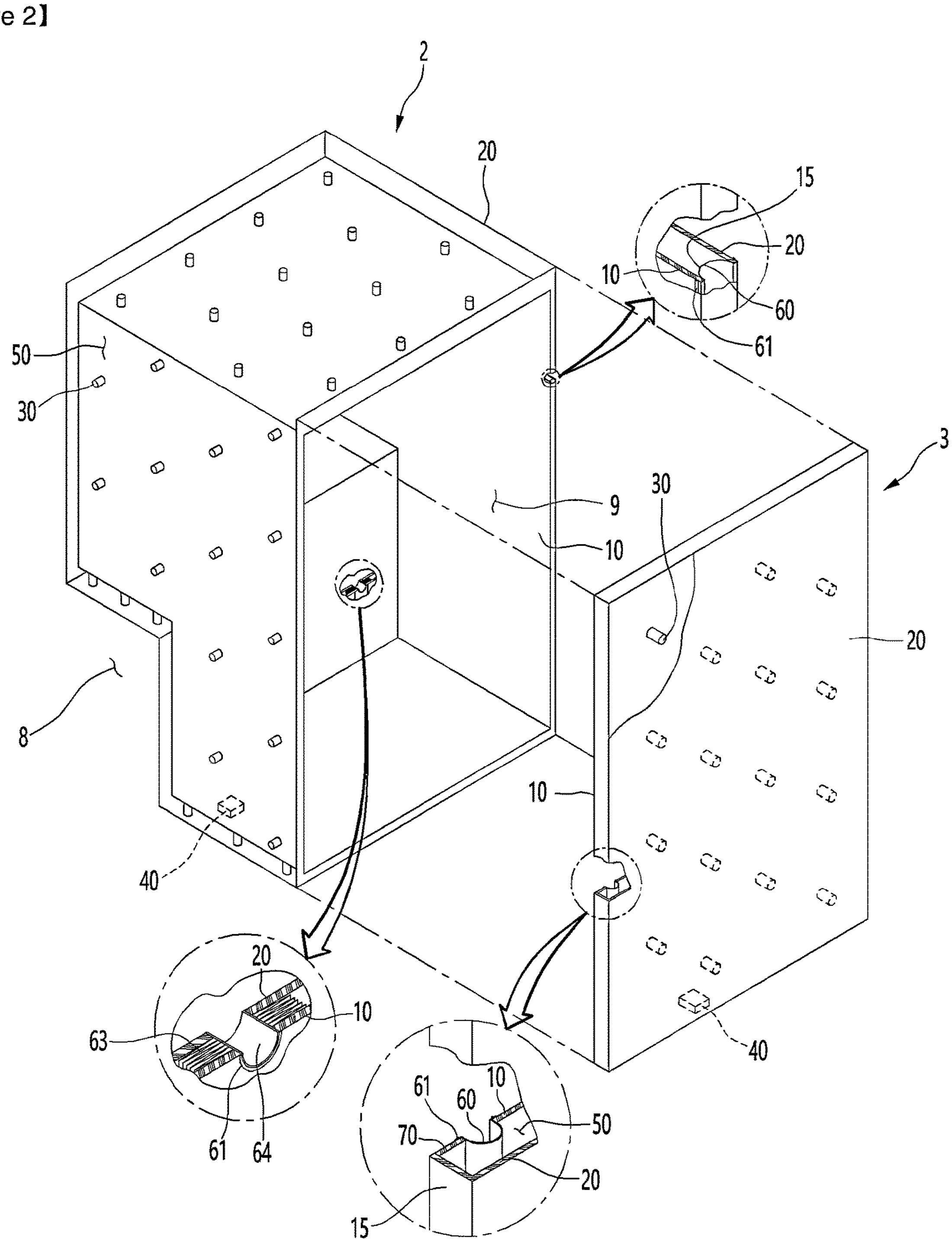

【Figure 3】
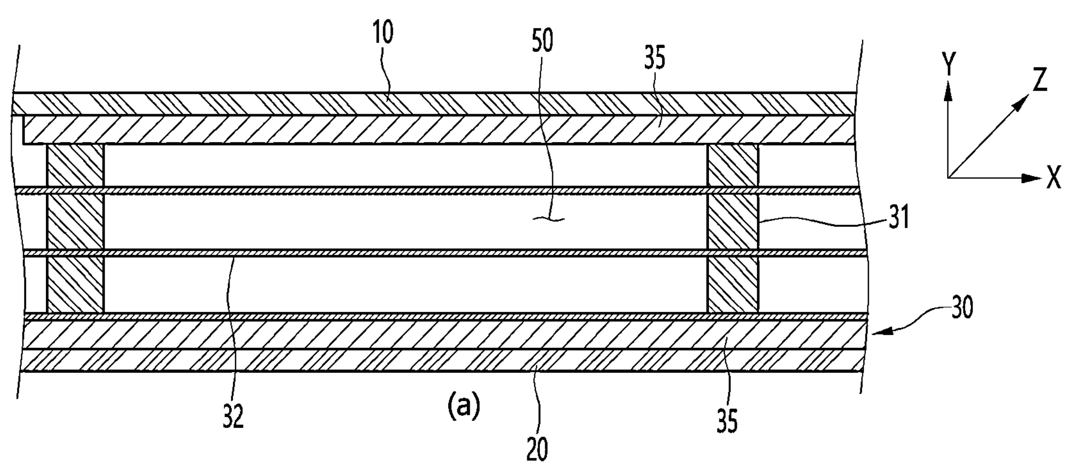
(a)
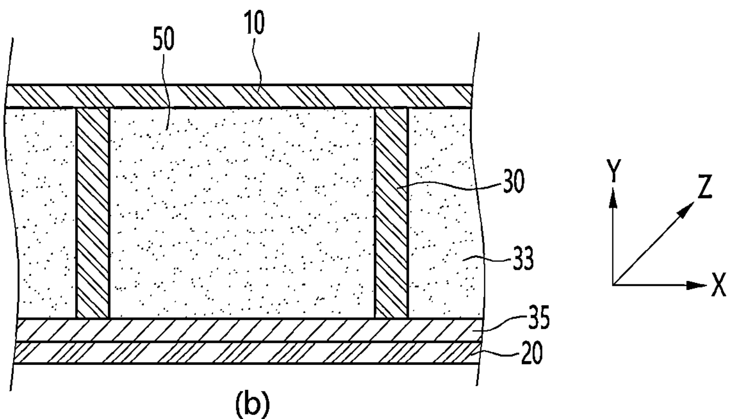
(b)
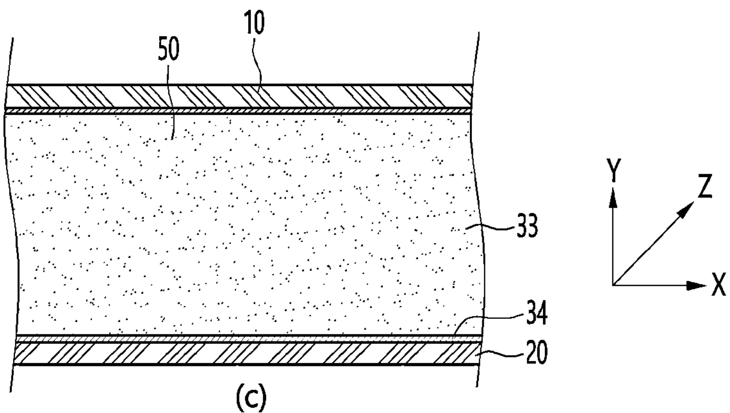
(c)

【Figure 4】
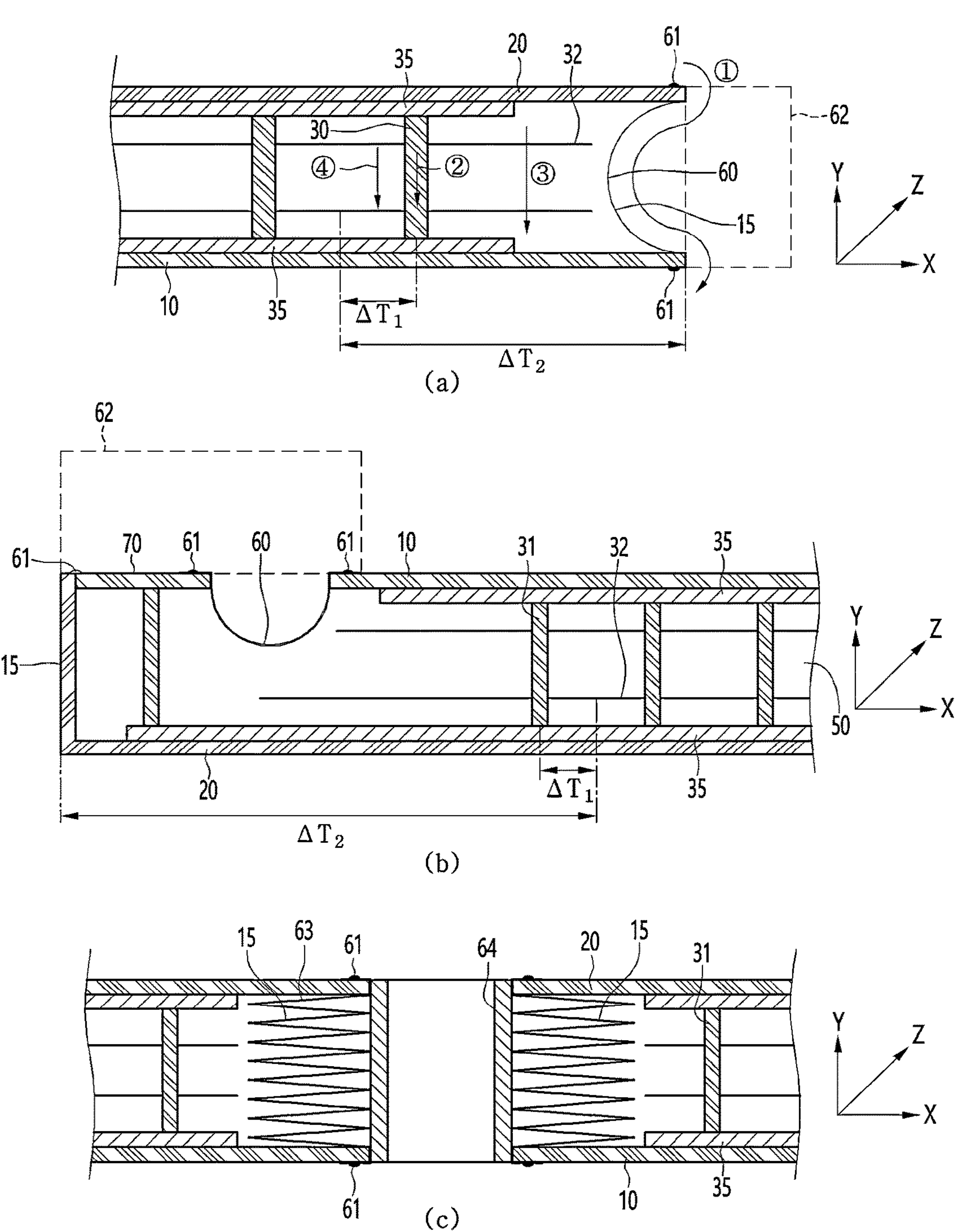

【Figure 5】
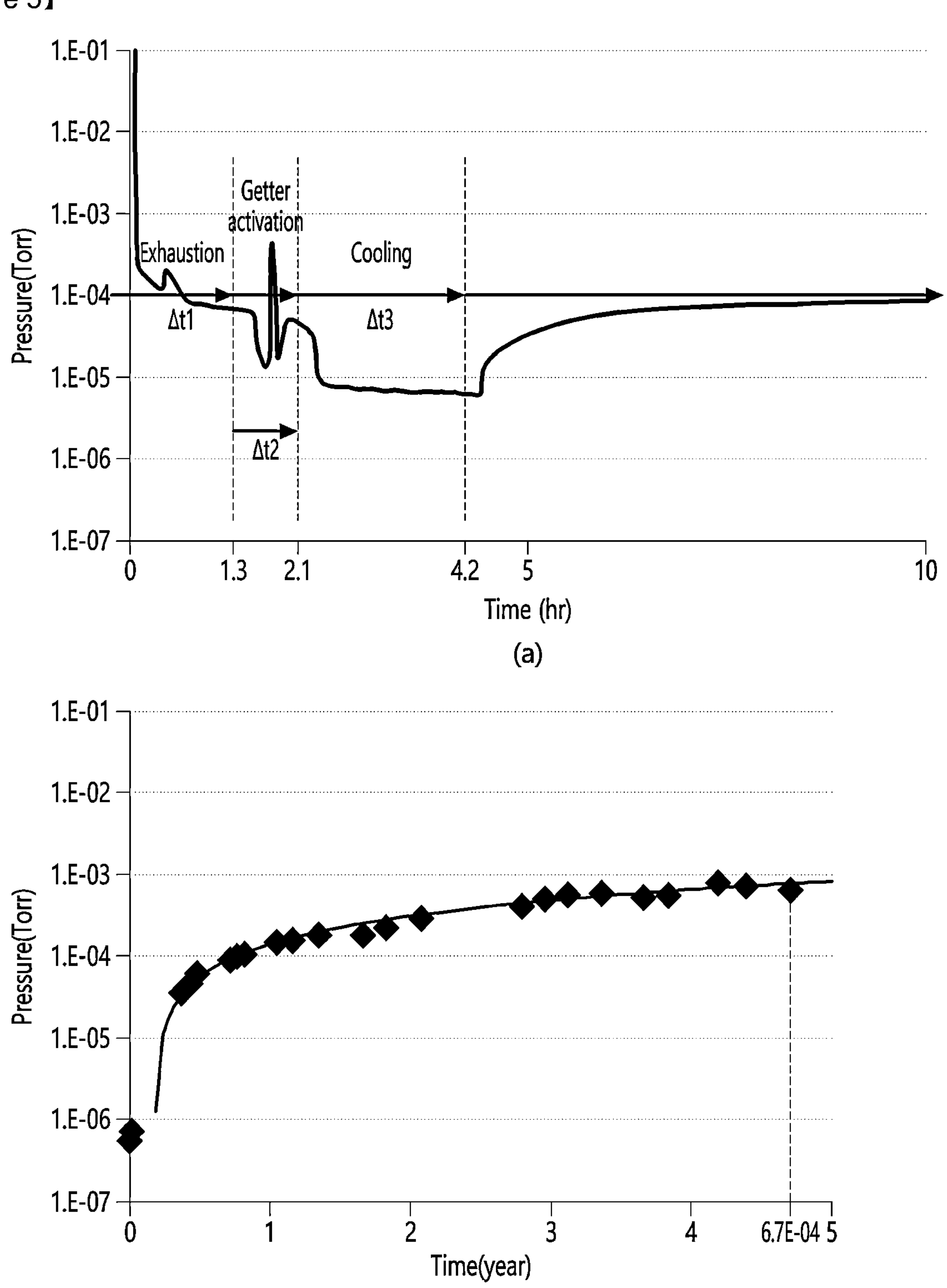

【Figure 6】
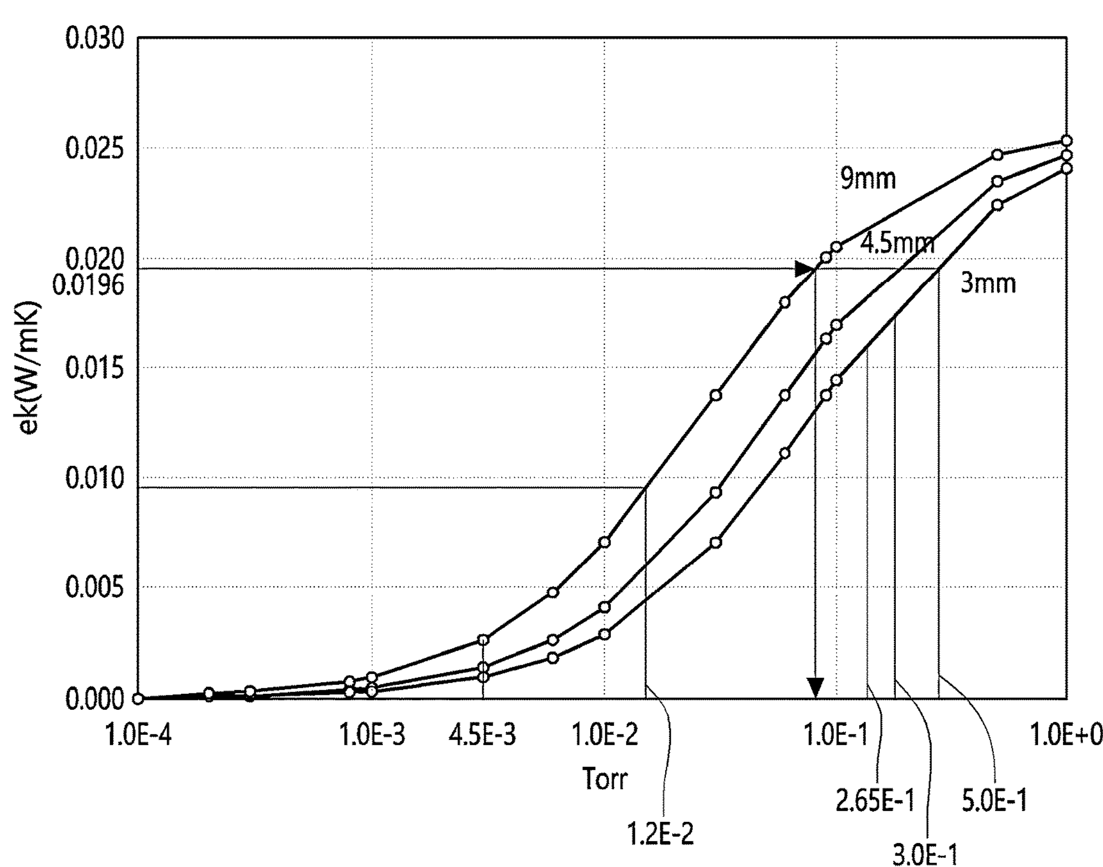

【Figure 7】
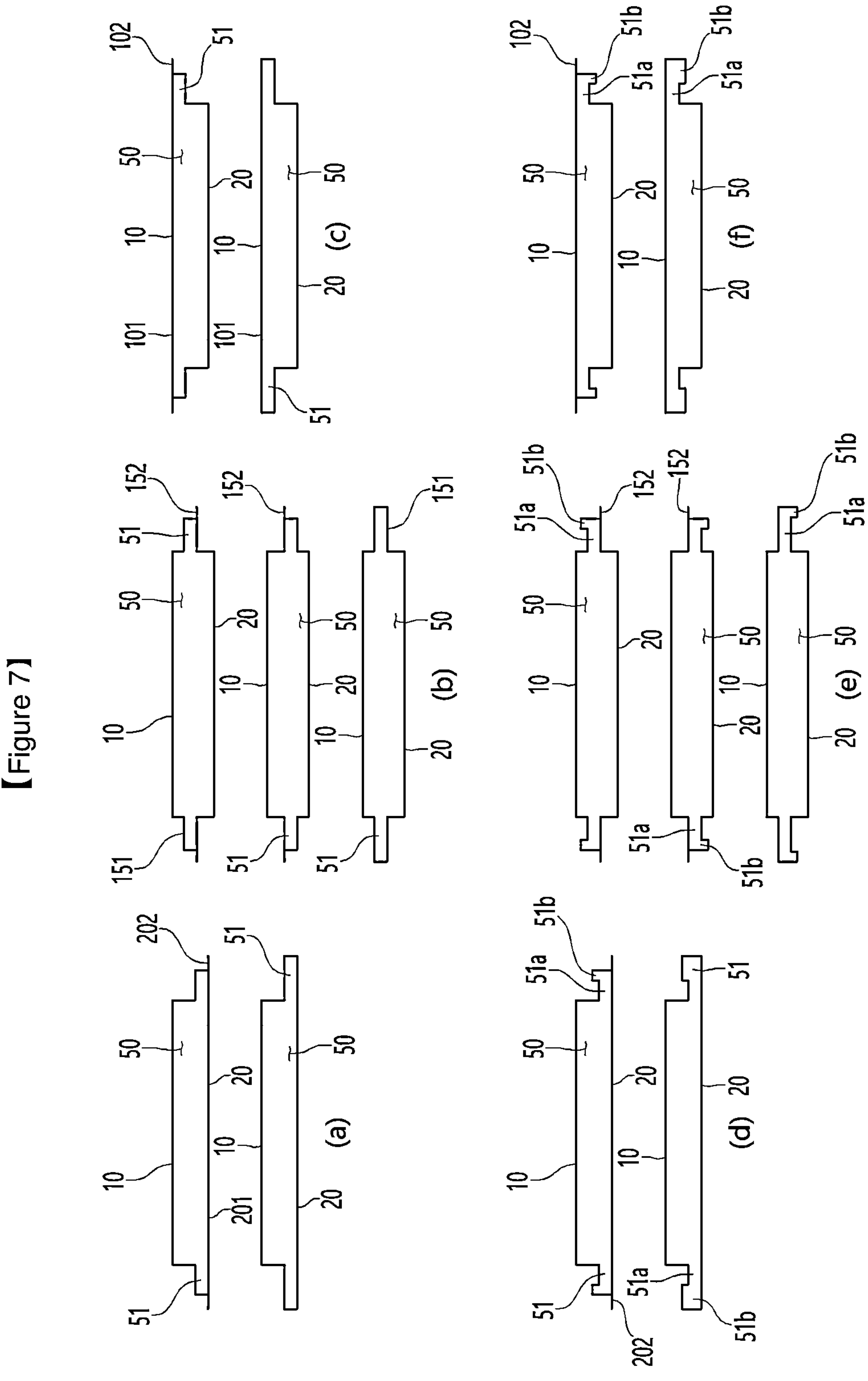

【Figure 8】
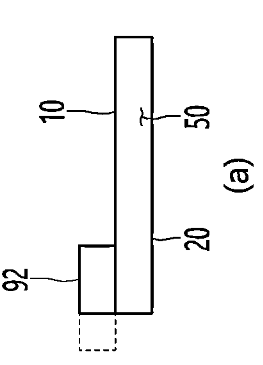
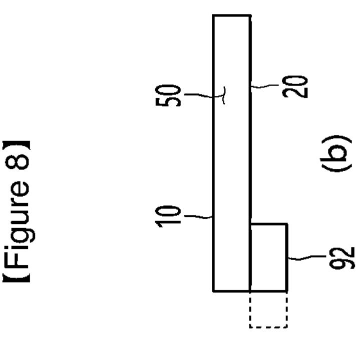
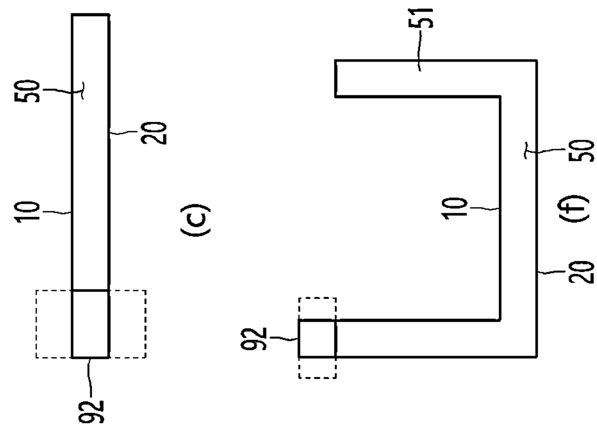
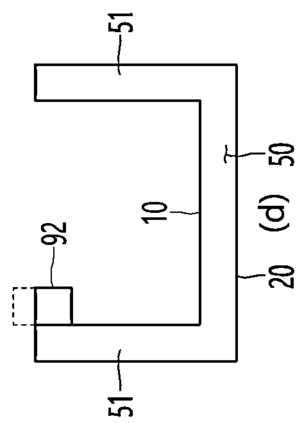
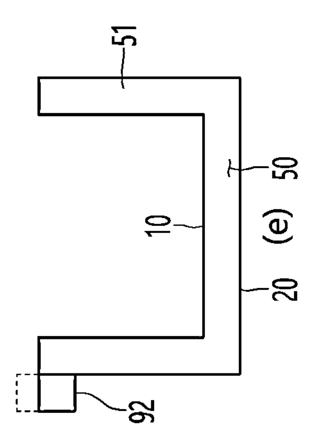
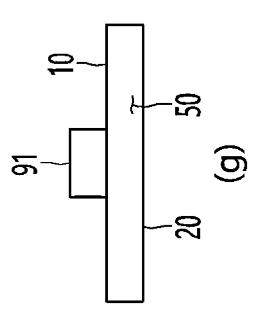
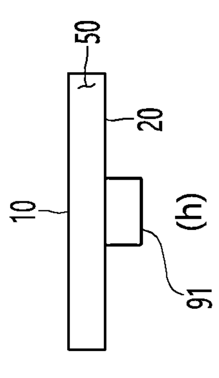

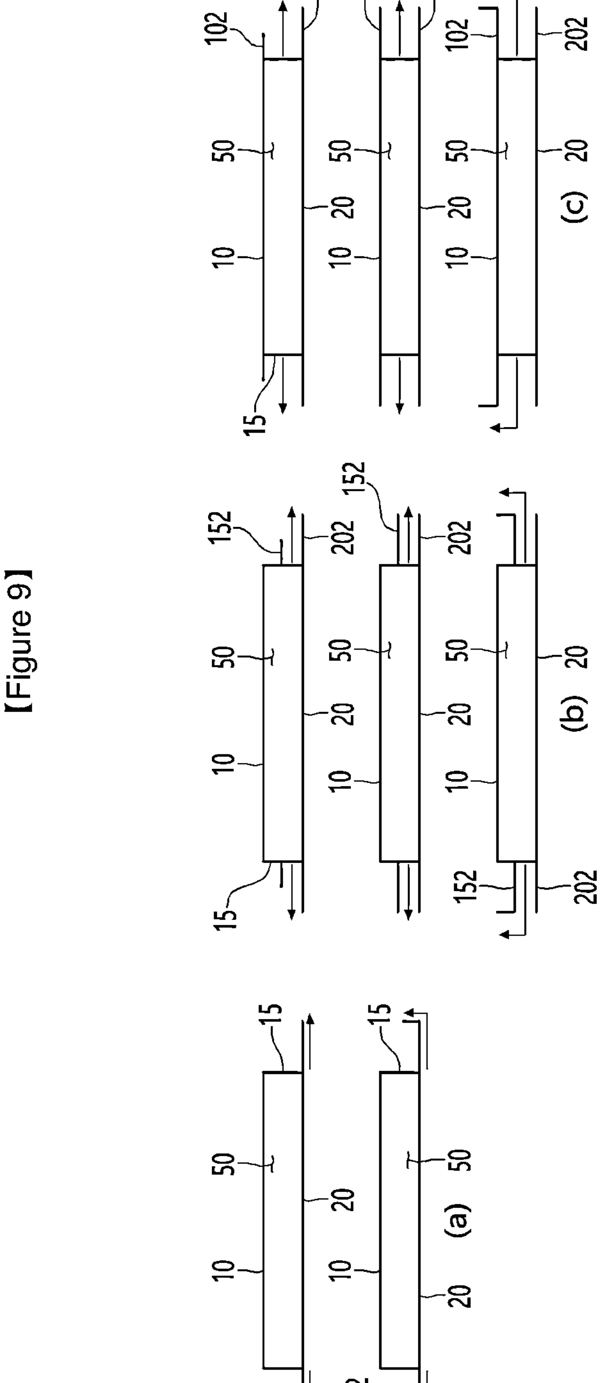
【Figure 9】
(a)
(b)
(c)
10
15
20
50
102
152
202
203

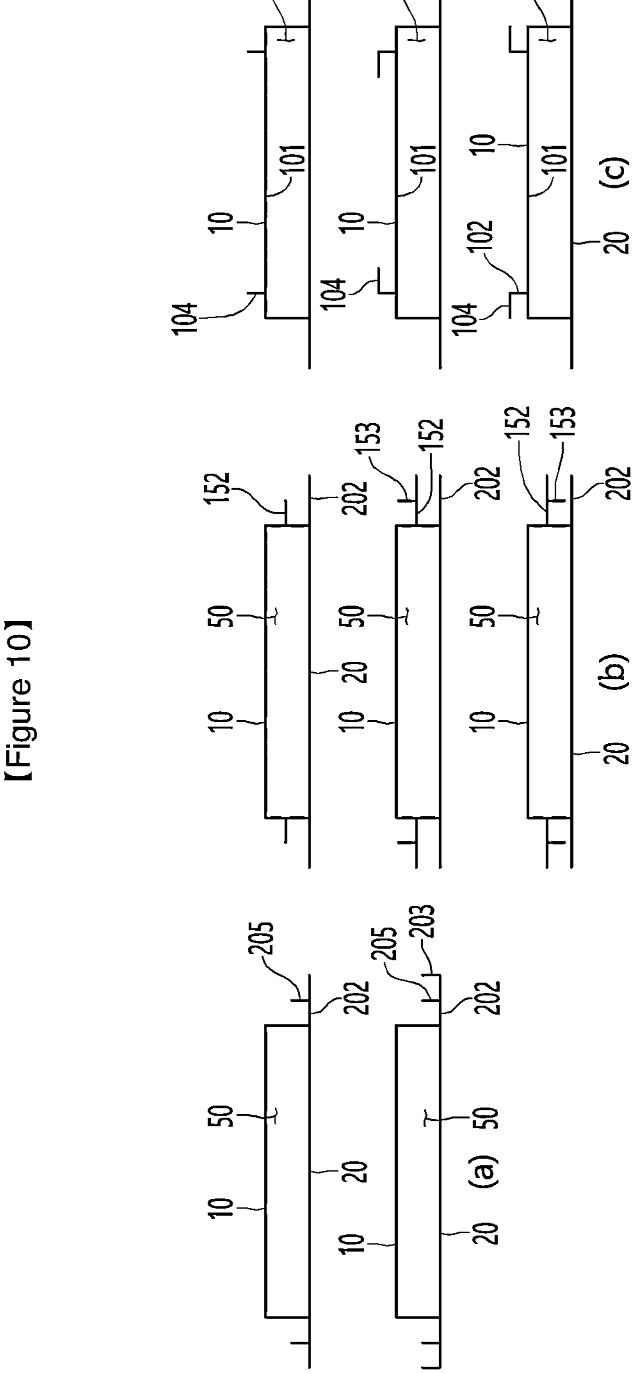
【Figure 10】
(a)
(b)
(c)
10
20
50
101
102
104
152
153
202
203
205

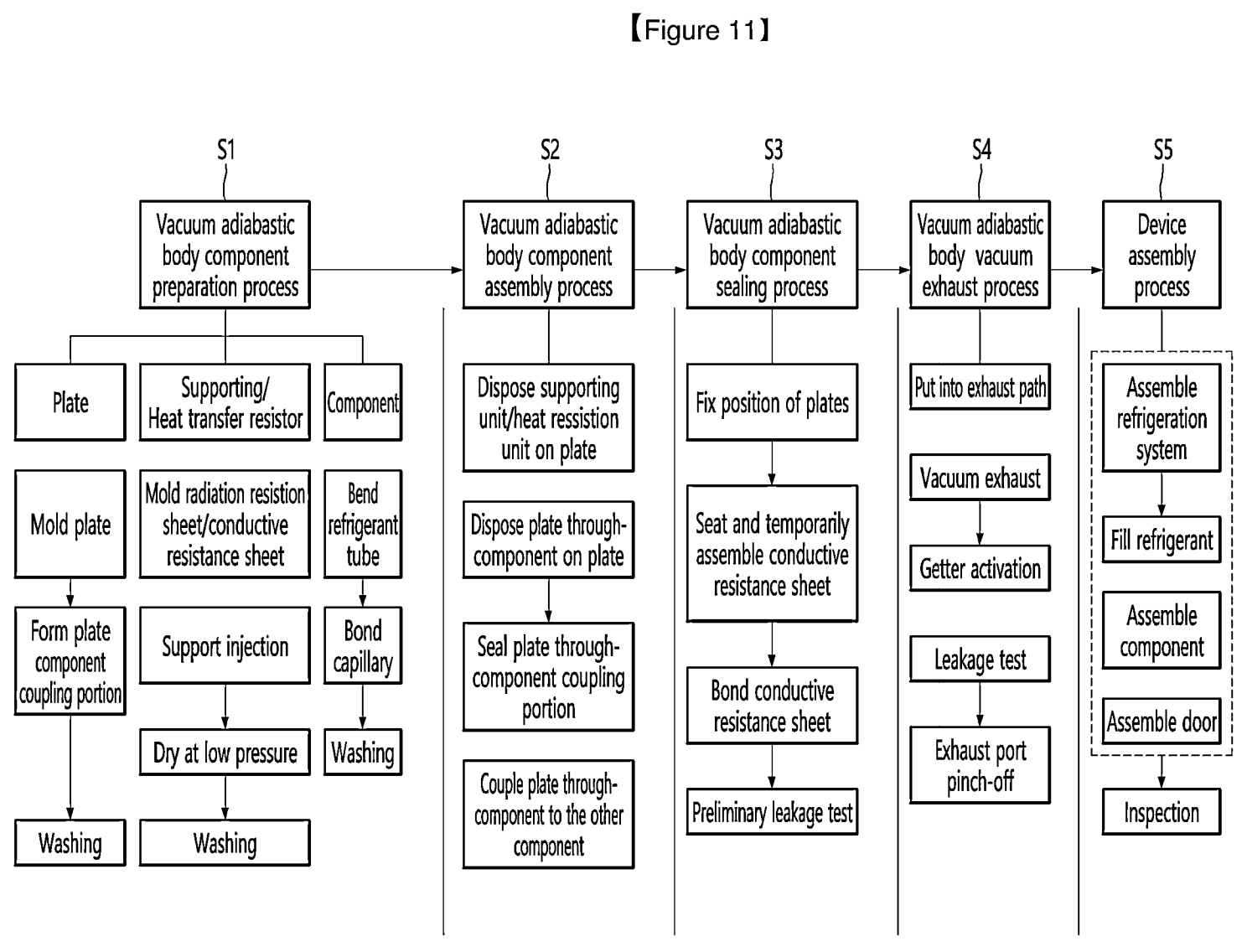

【Figure 11】

S1 Vacuum adiabastic body component preparation process
- Plate: Mold plate → Form plate component coupling portion → Washing
- Supporting/Heat transfer resistor: Mold radiation resistion sheet/conductive resistance sheet; Support injection → Dry at low pressure → Washing
- Component: Bend refrigerant tube → Bond capillary → Washing S2 Vacuum adiabastic body component assembly process
- Dispose supporting unit/heat ressistion unit on plate
- Dispose plate through-component on plate → Seal plate through-component coupling portion
- Couple plate through-component to the other component S3 Vacuum adiabastic body component sealing process
- Fix position of plates → Seat and temporarily assemble conductive resistance sheet → Bond conductive resistance sheet → Preliminary leakage test S4 Vacuum adiabastic body vacuum exhaust process
- Put into exhaust path
- Vacuum exhaust → Getter activation
- Leakage test → Exhaust port pinch-off S5 Device assembly process
- Assemble refrigeration system → Fill refrigerant
- Assemble component
- Assemble door
- → Inspection 【Figure 12】
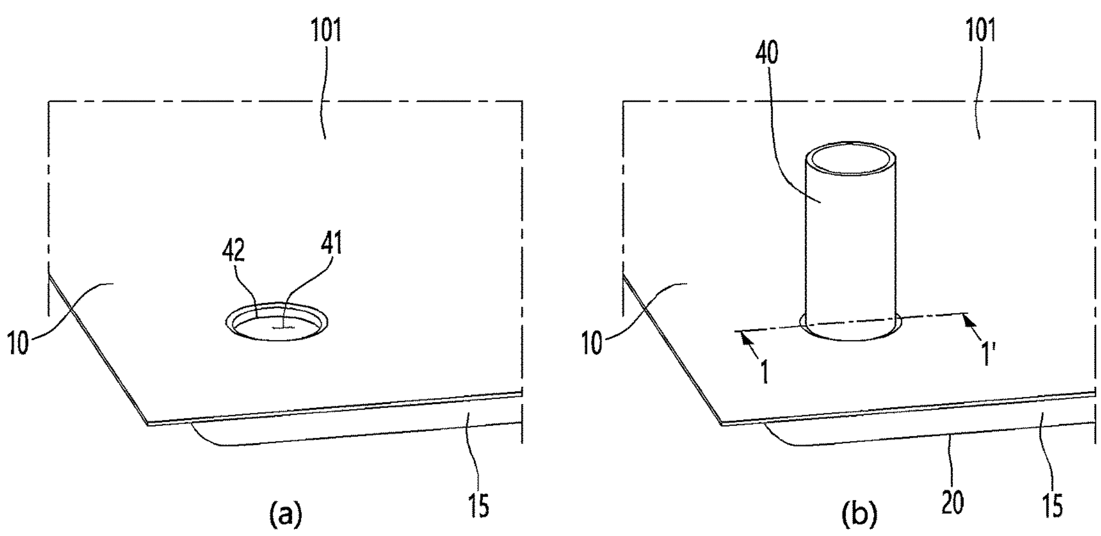
【Figure 13】
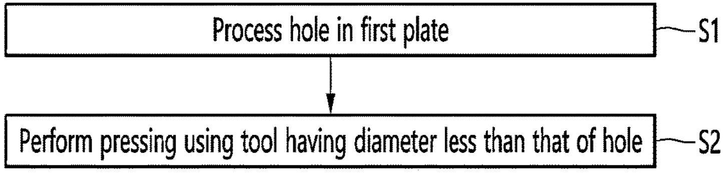

【Figure 14】
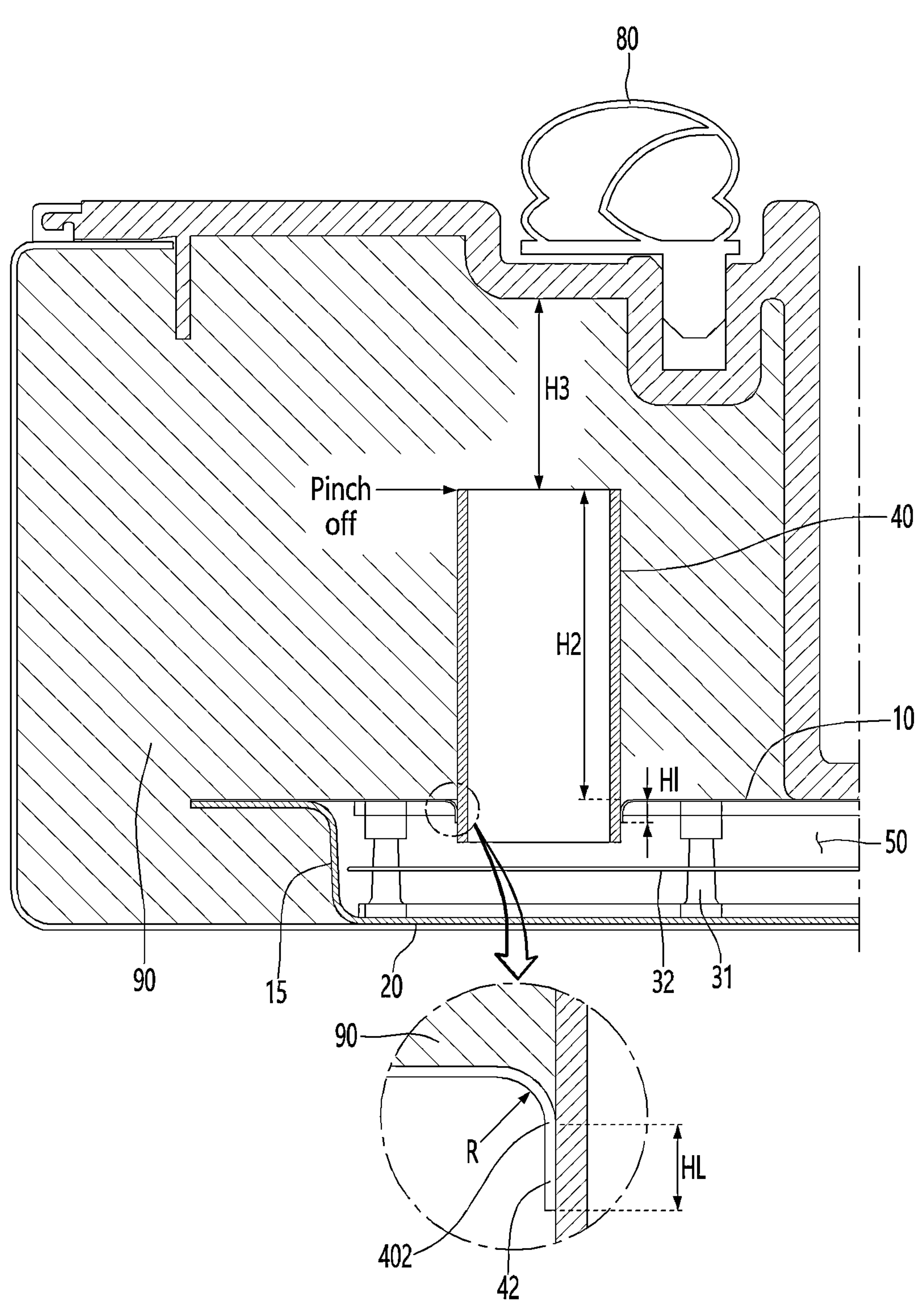

【Figure 15】
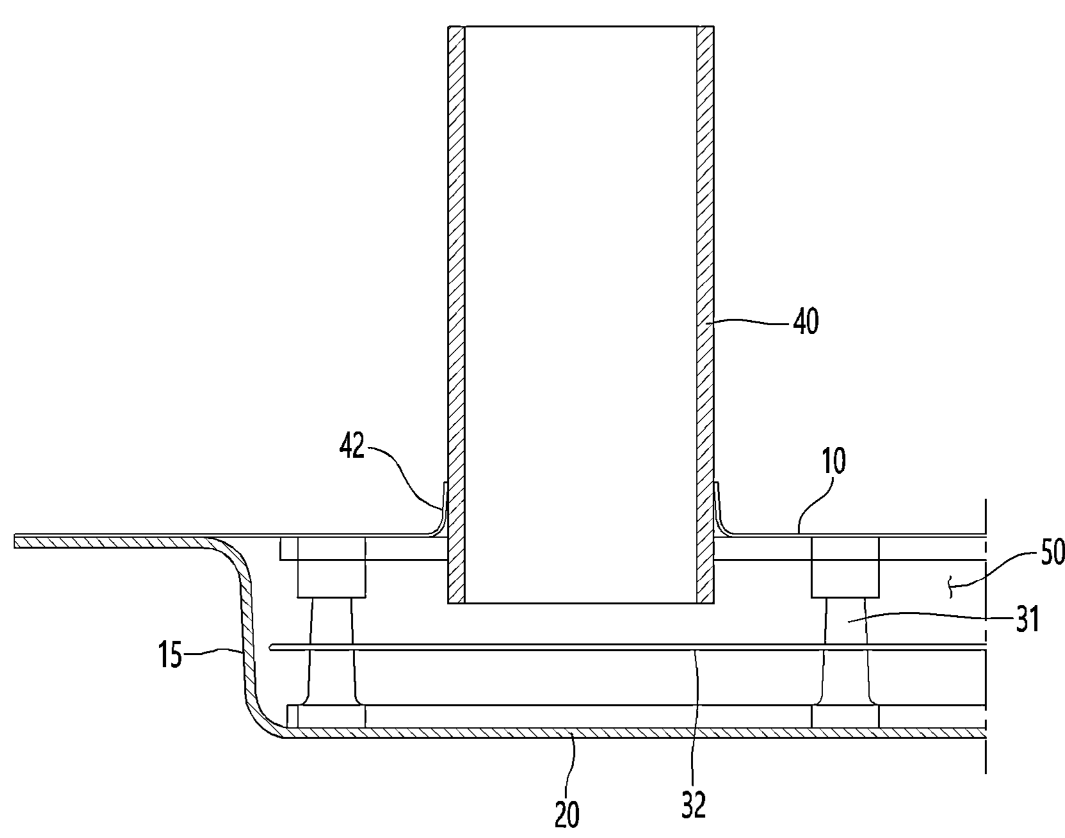

【Figure 16】
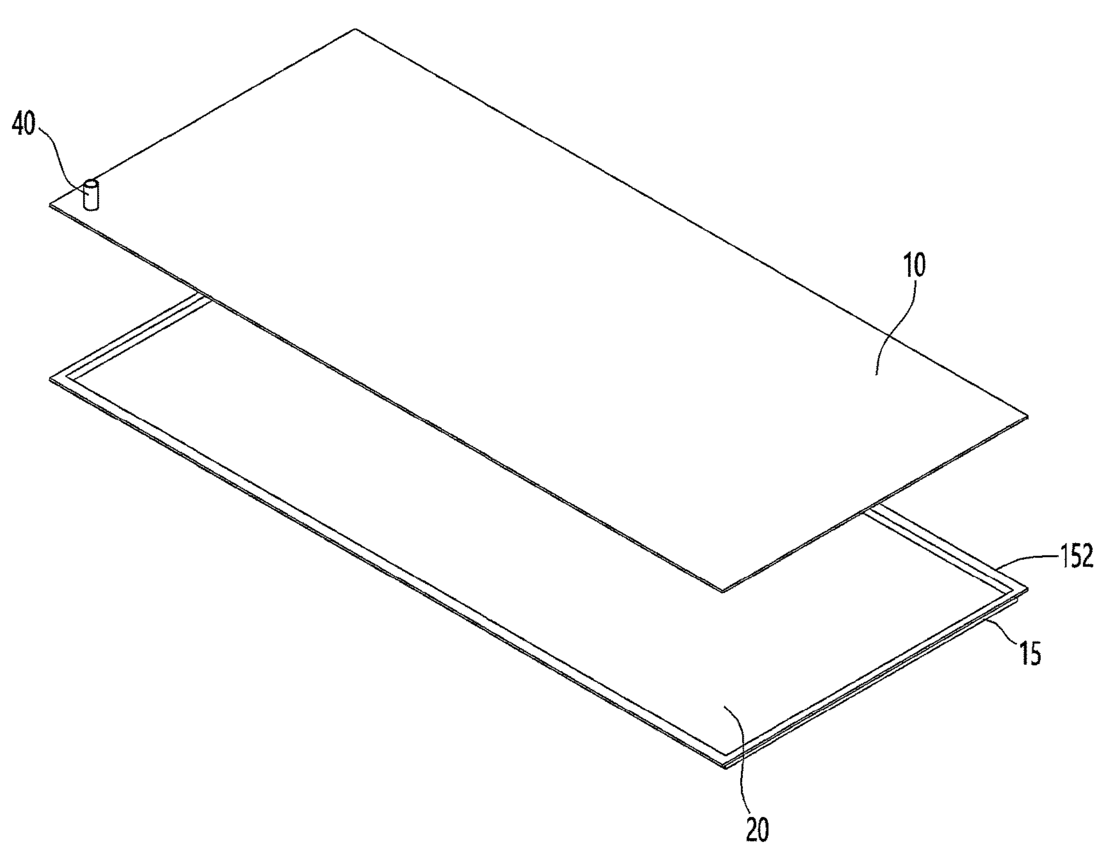

【Figure 17】
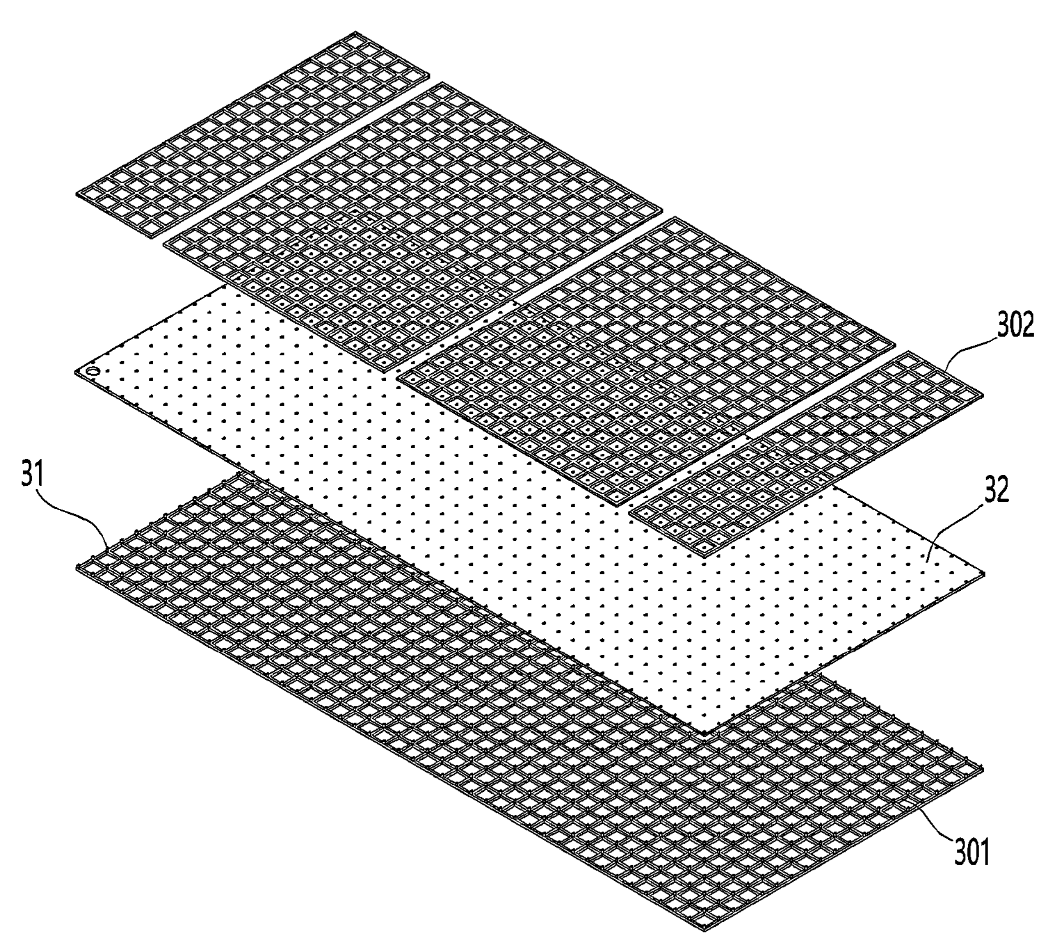

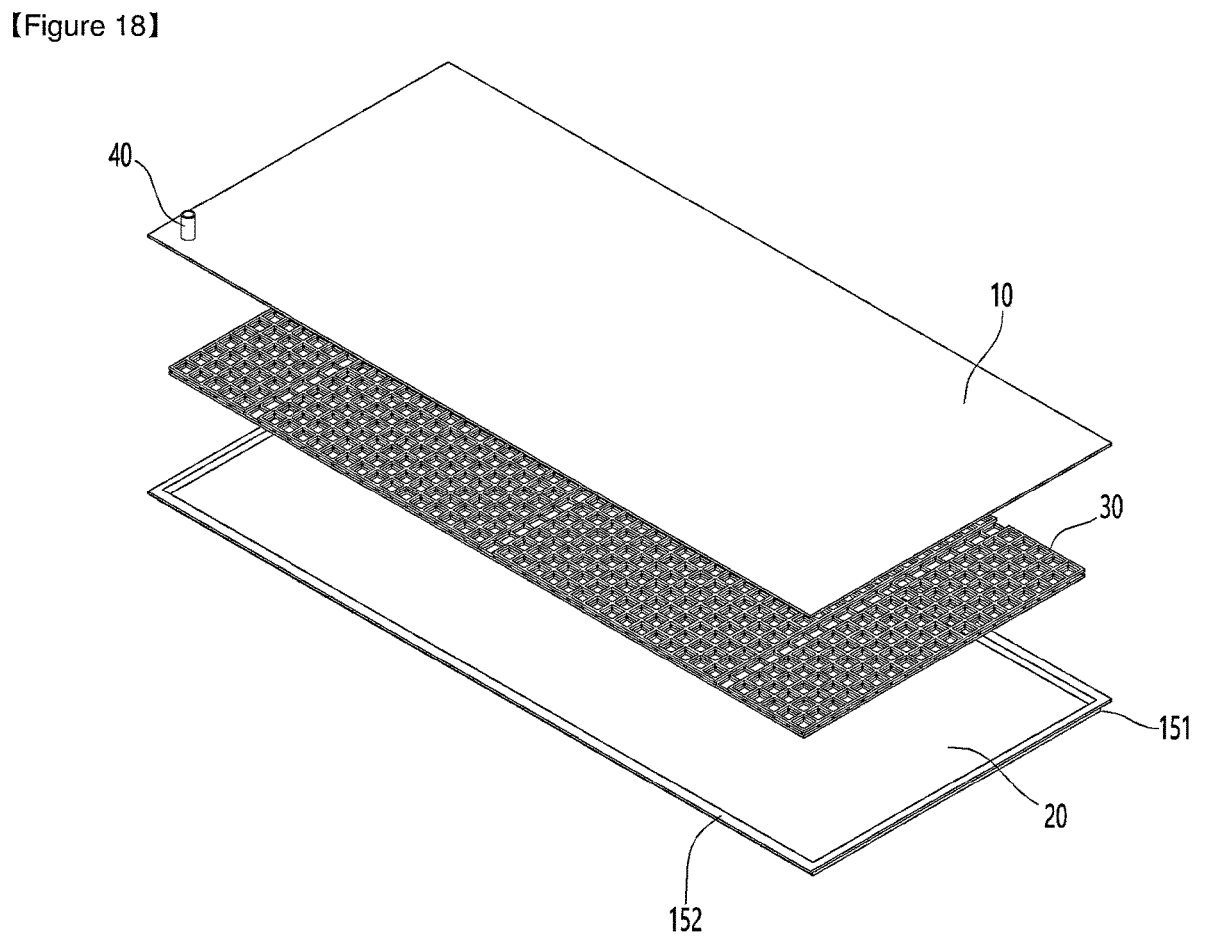

【Figure 18】

【Figure 19】
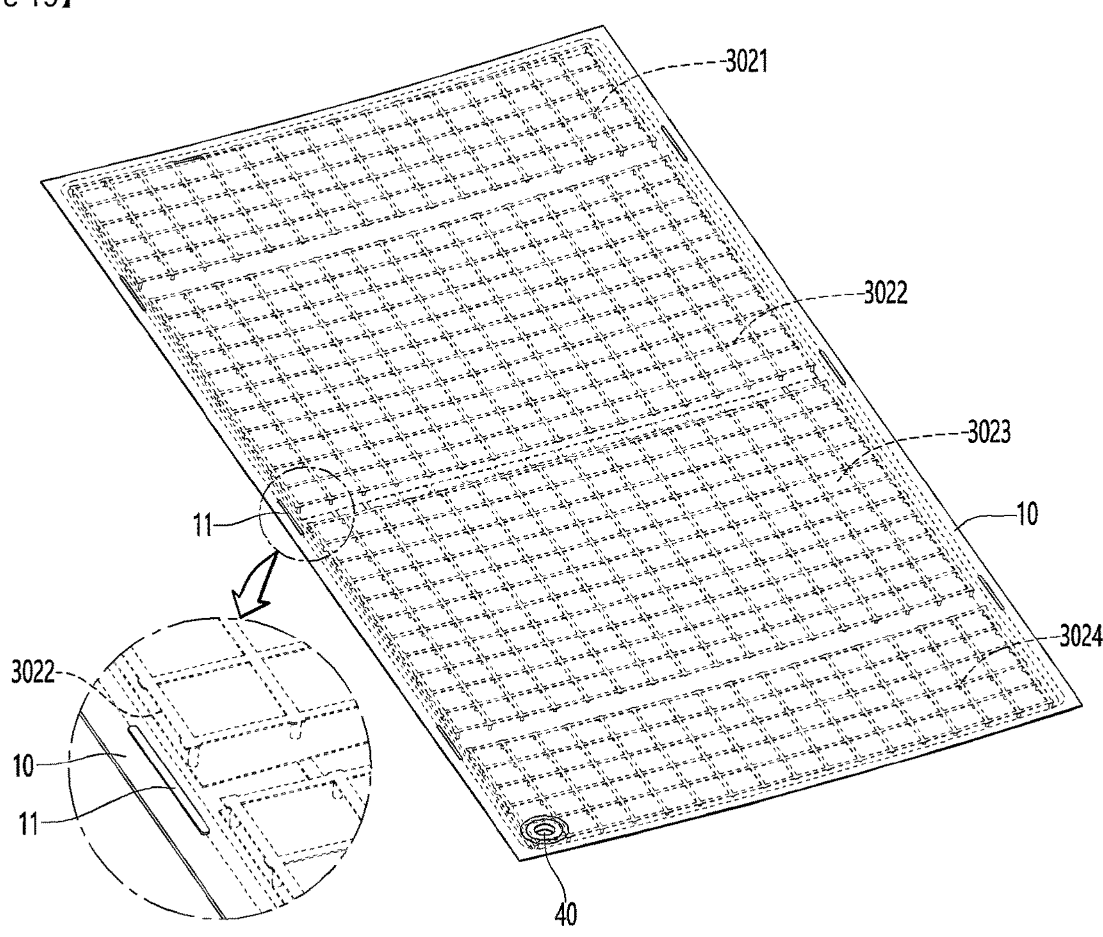

【Figure 20】
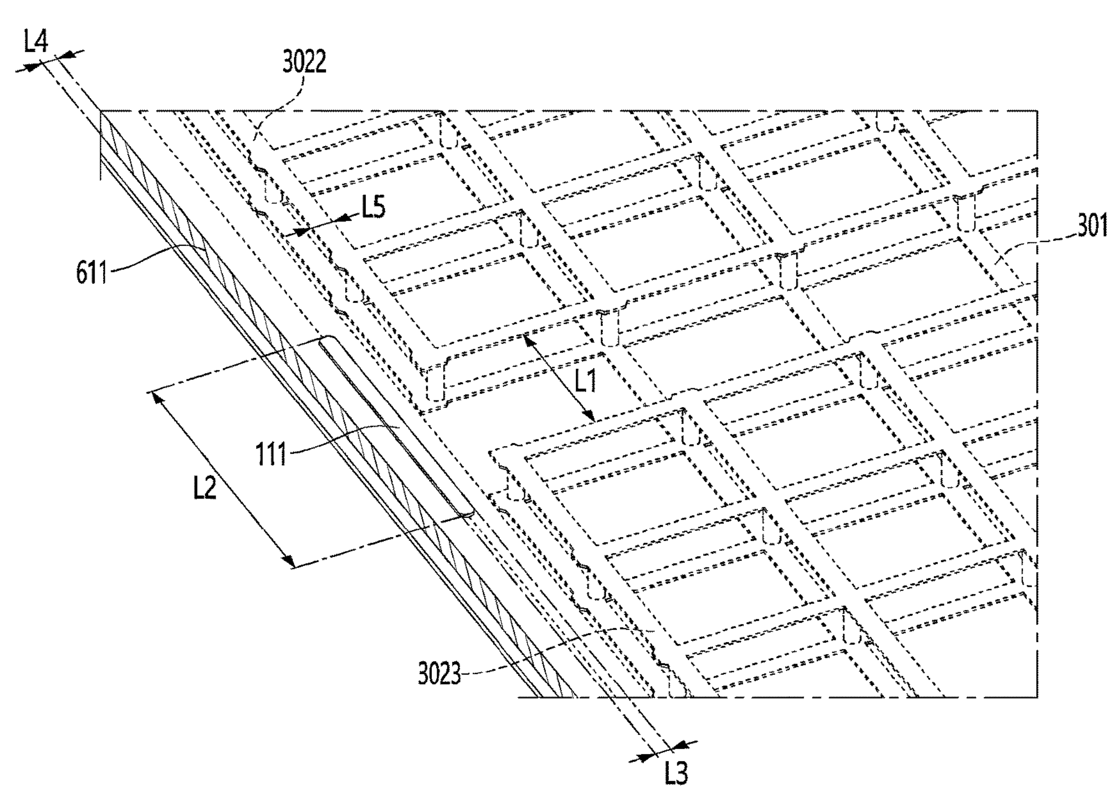

【Figure 21】
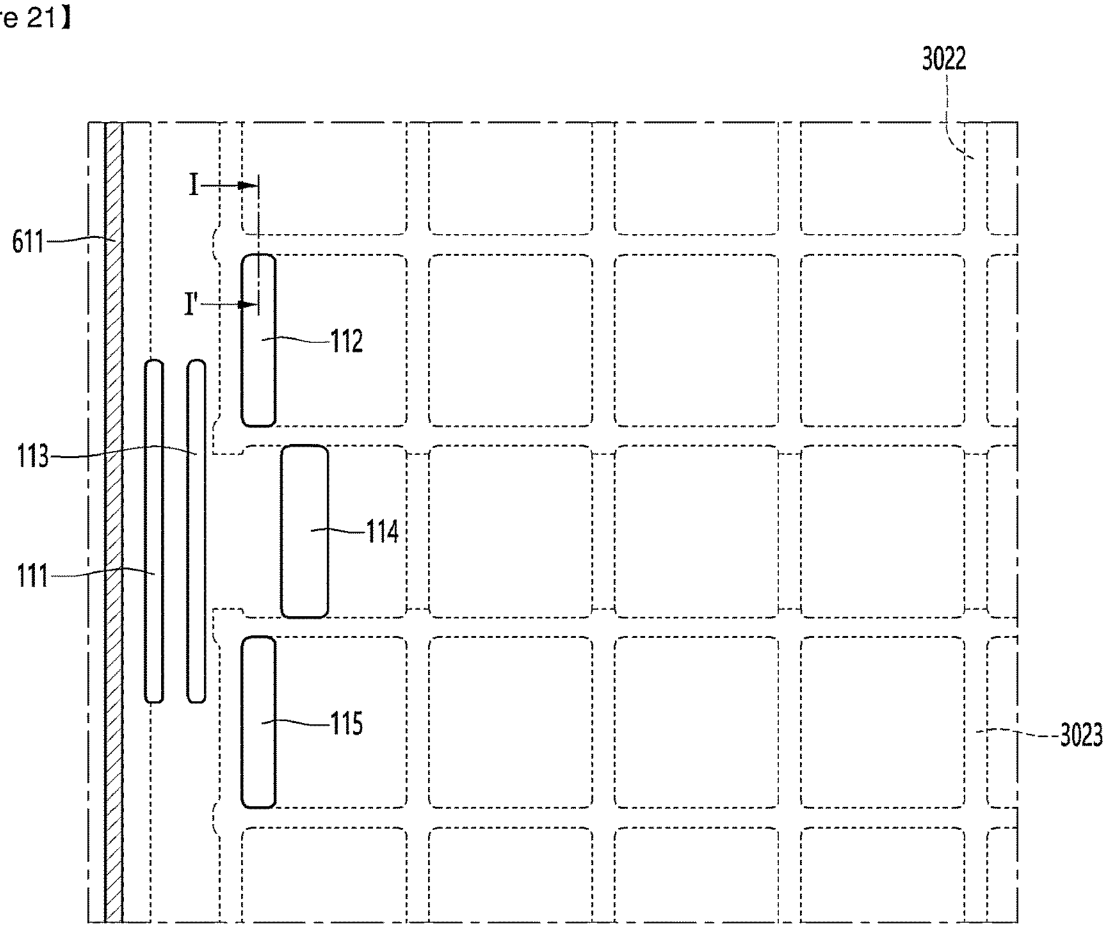

【Figure 22】
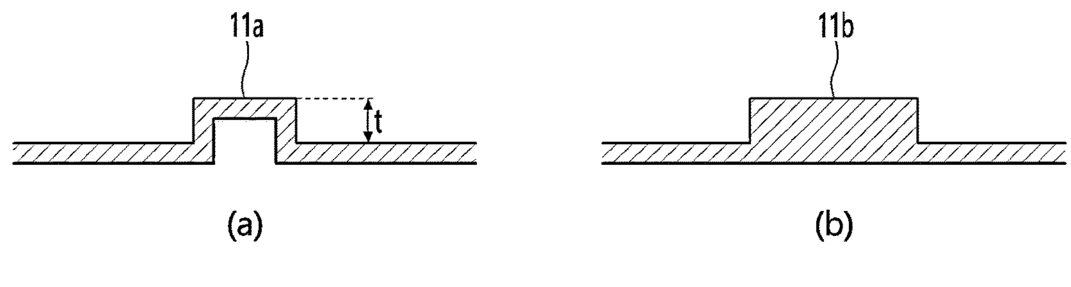
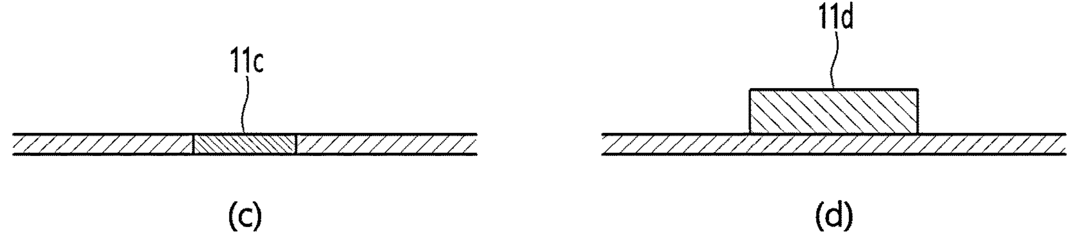
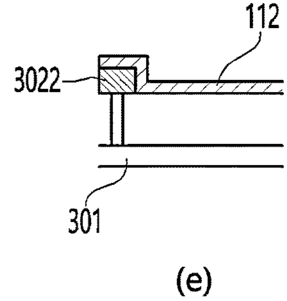

【Figure 23】
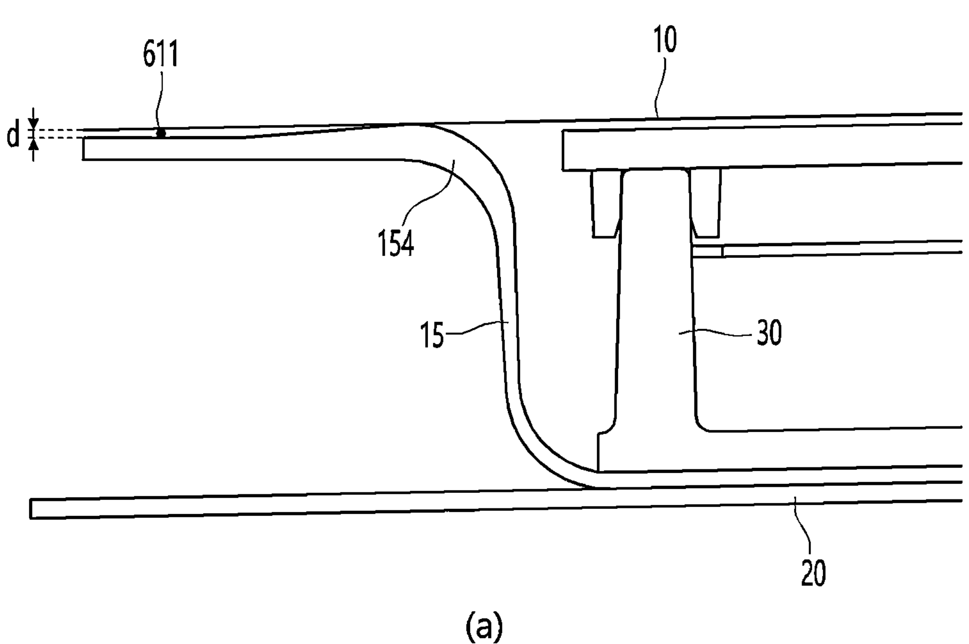
(a)
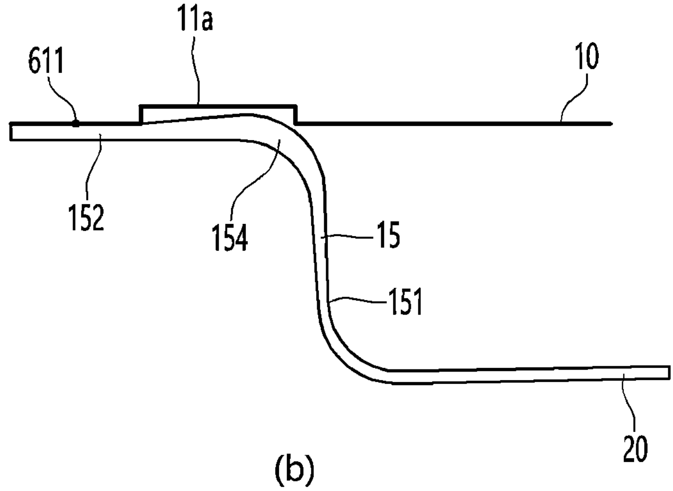
(b)

VACUUM ADIABATIC BODY AND METHOD FOR MANUFACTURING THE SAME

CROSS-REFERENCE TO RELATED PATENT APPLICATIONS

This application is a U.S. National Stage Application under 35 U.S.C. § 371 of PCT Application No. PCT/KR2022/019363, filed Dec. 1, 2022, which claims priority to Korean Patent Application No. 10-2021-0171921, filed Dec. 3, 2021, whose entire disclosures are hereby incorporated by reference.

BACKGROUND OF THE INVENTION

1. Field of the Invention

The present disclosure relates to a vacuum adiabatic body, and a method for manufacturing the same.

2. Description of Related Art

A vacuum adiabatic wall may be provided to improve adiabatic performance. A device of which at least a portion of an internal space is provided in a vacuum state to achieve an adiabatic effect is referred to as a vacuum adiabatic body.

The applicant has developed a technology to obtain a vacuum adiabatic body that is capable of being used in various devices and home appliances and has disclosed Korean Application Nos. 10-2015-0109724 and 10-2015-0109722 that relate to the vacuum adiabatic body.

In the cited document, a plurality of members are coupled to provide a vacuum space. Specifically, a first plate, a conductive resistance sheet, a side plate, and a second plate are sealed to each other. To seal the coupling portion of each member, a sealing process is performed. A small process error occurring in the sealing process leads to vacuum breakage.

BRIEF SUMMARY OF THE INVENTION

The present disclosure is to solve the above problems and proposes a vacuum adiabatic body with improved reliability. Various technical problems of the present disclosure are disclosed in detail in the description of the embodiments.

The vacuum adiabatic body of the present disclosure may include a first plate; a second plate; and a vacuum space provided between the first plate and the second plate. Optionally, the vacuum adiabatic body may include a seal configured to seal the first plate and the second plate so as to provide the vacuum space.

Optionally, the vacuum adiabatic body may include a strength reinforcement portion configured to reinforce the strength of the first plate. Optionally, the vacuum adiabatic body may include a strength reinforcement portion provided on the first plate in order to reinforce the strength. Optionally, the strength reinforcement portion may reinforce the strength of the vacuum adiabatic body. Optionally, the first plate may be thinner than the second plate. Optionally, the strength reinforcement portion may be provided on the peripheral portion of the first plate. In the present disclosure, the central portion of the object may be defined as a central portion of the three divided portions when the object is divided into thirds based on the longitudinal direction of the object. The peripheral portion of the object may be defined as a portion located on the left or right side of the central portion among the three divided portions.

Optionally, the strength reinforcement portion may extend along an extension direction of the peripheral portion of the first plate. Optionally, the strength reinforcement portion may be provided on the long side of the first plate.

Optionally, the reinforcement portion may prevent the deformation of the first plate, inhibit propagation of deformation of the first plate, or increase the flatness of the first plate in an area of the first plate corresponding to the seal.

Optionally, the vacuum adiabatic body may include a support for maintaining the vacuum space. It can be confirmed that the support is seated at the correct position by using the strength reinforcement portion.

Optionally, the vacuum adiabatic body may include a support for maintaining the vacuum space. The first plate may include a first surface and a second surface for forming a predetermined thickness, and the first surface may be disposed in a direction facing the vacuum space. The support may be disposed to face the first surface, and the strength reinforcement portion may be disposed to protrude in a direction opposite to a space where the support is not disposed. The support may be disposed to face the second surface, and the strength reinforcement portion may be disposed to protrude in a direction opposite to a space where the support is not disposed. The seal may be provided to have a predetermined area, and the strength reinforcement portion may be provided inside the area. The strength reinforcement portion may be provided in contact with or spaced apart from the seal. The strength reinforcement portion may be disposed farther than the seal from the edge of the vacuum adiabatic body in the longitudinal direction of the vacuum adiabatic body. The strength reinforcement portion may be disposed closer than the seal from the edge of the vacuum adiabatic body in the longitudinal direction of the vacuum adiabatic body. The support may be provided to have a predetermined area, and the strength reinforcement portion may be provided inside the predetermined area. The strength reinforcement portion may be provided in contact with or spaced apart from the support. The strength reinforcement portion may be disposed farther than the support from the edge of the vacuum adiabatic body in the longitudinal direction of the vacuum adiabatic body. The strength reinforcement portion may be disposed closer than the support from the edge of the vacuum adiabatic body in the longitudinal direction of the vacuum adiabatic body. The support may include a first support and a second support disposed closer than the first support from an edge of the vacuum adiabatic body in a longitudinal direction of the vacuum adiabatic body. The strength reinforcement portion may be disposed farther than the second support from the edge of the vacuum adiabatic body in the longitudinal direction of the vacuum adiabatic body. The strength reinforcement portion may be disposed closer than the second support from an edge of the vacuum adiabatic body in the longitudinal direction of the vacuum adiabatic body. The strength reinforcement portion may be placed between the seal and the support. The seal may be disposed closer than the support from an edge of the vacuum adiabatic body in the longitudinal direction of the vacuum adiabatic body. The strength reinforcement portion may be placed between the seal and the support in the longitudinal direction of the vacuum adiabatic body.

Optionally, the vacuum adiabatic body may further include a support for maintaining the vacuum space. The first plate may include a first surface and a second surface for forming a predetermined thickness, and the first surface may be disposed in a direction facing the vacuum space. The support may be disposed to face the first surface, and the strength reinforcement portion may be disposed to protrude in a direction opposite to a space in which the support is disposed. The support may be disposed to face the second surface, and the strength reinforcement portion may be disposed to protrude in a direction opposite to a space in which the support is disposed. The support may have a frame that provides a grid area. The grid area may extend in a longitudinal direction of the vacuum space. The grid area may provide a quadrangle. The strength reinforcement portion may be placed inside the grid area. At least a portion of the strength reinforcement portion may be disposed in contact with or spaced apart from the frame. The support may be provided as at least two components that are separable from each other. The support may be provided as at least two components that are spaced apart. The strength reinforcement portion may be disposed in a gap between the at least two components. At least a portion of the strength reinforcement portion may be disposed in contact with or spaced apart from the at least two components.

Optionally, the major axis of the strength reinforcement portion may be placed to be inclined in a direction of gap between the two components constituting the support. The major axis of the strength reinforcement portion may be placed perpendicular to the gap between the two components constituting the support. Optionally, the width L3 of the strength reinforcement portion may be shorter than the length L2. Optionally, the width L3 of the strength reinforcement portion may be greater than the width of the seal. Optionally, the width L3 of the strength reinforcement portion may be smaller than the width L5 of the frame constituting the support. Optionally, the width L3 of the strength reinforcement portion may be greater than the thickness of the strength reinforcement portion. Optionally, the thickness of the strength reinforcement portion may be thicker than the thickness of the first plate. Optionally, the length of the strength reinforcement portion may be longer than the gap L1 between the two components forming the support. Optionally, the length of the strength reinforcement portion may be less than three times the gap L1 between the two components forming the support.

Optionally, the strength reinforcement portion may be provided as a formed strength reinforcement portion formed in at least one direction. Optionally, the strength reinforcement portion may be provided as a different shape strength reinforcement portion protruding in at least one direction. Optionally, the strength reinforcement portion may be provided as a different material strength reinforcement portion including two materials which is different from each other. Optionally, the strength reinforcement portion may be provided as an additional strength reinforcement portion to which a predetermined member is added in at least one direction.

A method for manufacturing a vacuum adiabatic body according to the present disclosure includes: a vacuum adiabatic body component preparation step of manufacturing a component applied to the vacuum adiabatic body; a vacuum adiabatic body component assembly step of assembling the components; a vacuum adiabatic body component sealing step of scaling the outer wall of the vacuum space to block the vacuum space from the external space; a vacuum adiabatic body vacuum exhausting step of exhausting the internal air of the vacuum space; and a device assembling step of providing a device using the vacuum adiabatic body. Optionally, the manufacturing method may include a step of providing a strength reinforcement portion to the plate in the vacuum adiabatic body component preparation step in order to reinforce the strength of the plate.

Optionally, the strength reinforcement portion may be provided to reinforce the strength of the plate in the step of sealing the outer wall of the vacuum space.

The vacuum adiabatic body according to the present disclosure can maintain a high adiabatic effect for a long time. Various effects of the present disclosure are disclosed in more detail in the description of the embodiments.

BRIEF DESCRIPTION OF THE DRAWINGS

FIG. 1 is a perspective view of a refrigerator according to an embodiment.

FIG. 2 is a view schematically illustrating a vacuum adiabatic body used in a body and a door of the refrigerator.

FIG. 3 is a view illustrating an example of a support that maintains a vacuum space.

FIG. 4 is a view for explaining an example of the vacuum with respect to a heat transfer resistor.

FIG. 5 is a graph illustrating results obtained by observing a process of exhausting the inside of the vacuum adiabatic body with a time and pressure when the support is used.

FIG. 6 is a graph illustrating results obtained by comparing a vacuum pressure to gas conductivity.

FIG. 7 is a view illustrating various examples of the vacuum space.

FIG. 8 is a view for explaining another adiabatic body.

FIG. 9 is a view for explaining a heat transfer path between first and second plates having different temperatures.

FIG. 10 is a view for explaining a branch portion on the heat transfer path between first and second plates having different temperatures.

FIG. 11 is a view for explaining a method for manufacturing a vacuum adiabatic body.

FIG. 12 is an enlarged perspective view illustrating an upper side of a corner portion in which a tube is installed in the vacuum adiabatic body.

FIG. 13 is a view for explaining a method of processing a through-hole of the first plate.

FIG. 14 is a cross-sectional view taken along line 1-1' of (b) of FIG. 12.

FIG. 15 illustrates an example in which a flange extends toward the outside of the vacuum space.

FIGS. 16 to 18 are views for explaining a method for manufacturing a vacuum adiabatic body.

FIG. 19 is a perspective view illustrating a vacuum adiabatic body according to the embodiment.

FIG. 20 is a view illustrating in detail the relationship between the strength reinforcement portion and the seal.

FIG. 21 is a view illustrating an embodiment of another strength reinforcement portion according to the position.

FIG. 22 is a view illustrating an embodiment of another strength reinforcement portion according to the method for providing the strength reinforcement portion.

FIG. 23 is a view for explaining the action of the formed strength reinforcement portion.

DETAILED DESCRIPTION OF THE INVENTION

Hereinafter, specific embodiments will be described in detail with reference to the accompanying drawings. The disclosure may, however, be embodied in many different forms and should not be construed as being limited to the embodiments set forth herein, and a person of ordinary skill in the art, who understands the spirit of the present disclosure, may readily implement other embodiments included within the scope of the same concept by adding, changing, deleting, and adding components; rather, it will be understood that they are also included within the scope of the present disclosure. The present disclosure may have many embodiments in which the idea is implemented, and in each embodiment, any portion may be replaced with a corresponding portion or a portion having a related action according to another embodiment. The present disclosure may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present disclosure, an embodiment of the support may be the combine or seal, which will be described later. In the present disclosure, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A peripheral portion of the object may be defined as a portion disposed at a left or right side of the central portion among the three divided portions. The peripheral portion of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two components connected to each other. As a first example, the plate may include at least two components connected to each other in a direction along a wall defining the vacuum space. Any one of the two components may include a portion (e.g., a first portion) defining the vacuum space. The first portion may be a single portion or may include at least two components that are sealed to each other. The other one of the two components may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and/or a second plate 20. One surface of the first plate (e.g., the inner surface of the first plate) may provide a wall defining the vacuum space, and the other surface (e.g., the outer surface of the first plate) of the first plate may provide a wall defining the first space. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (e.g., the inner surface of the second plate) may provide a wall defining the vacuum space, and the other surface (e.g., the outer surface of the first plate) of the second plate may provide a wall defining the second space. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may be provided in, at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The scaling may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-coupling or pressure-welding by a method such as pinch-off or etc.

A machine room 8 may be optionally provided outside the vacuum adiabatic body. The machine room may be defined as a space in which components connected to the cold source are accommodated. Optionally, the vacuum adiabatic body may include a port 40. The port may be provided at at least any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate, or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as at least any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and the one surface of the first plate and the one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, an adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of an adjacent portion of one surface of the support and an adjacent portion of the other surface of the support, or be provided to cover at least a portion of an adjacent portion of one surface of the support and an adjacent portion of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and/or a filler 33. In this embodiment, the support may include at least any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space or a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate. As another example, one surface of the bar may be provided to support at least a portion of the plate, and the other surface of the bar may be provided to support the other portion of the plate. The support may include a bar having an empty space therein or a plurality of bars. The support may have an empty space are provided between the plurality of bars. The support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. The support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. The support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include at least any one of the above examples or an example in which two or more examples are combined.

Referring to FIG. 3*a*, as an embodiment, the support may include a bar 31 and a connection plate and support plate 35. The connection plate and the supporting plate may be designed separately. Referring to FIG. 3*b*, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3*c*, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be at least any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the peripheral portion of the first plate or the peripheral portion of the second plate or be provided on at least a portion of an edge of the first plate or an edge of the second plate. The heat transfer resistor may be provided at a portion, in which a through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be at least one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate. The heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate. The heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4*a*, for example, a conductive resistance sheet may be provided on a side plate connecting the first plate to the second plate. Referring to FIG. 4*b*, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion to which a component for sealing the door and the body and a component disposed outside the vacuum space such as the exhaust port and the getter port, which are required for the exhaust process and for maintaining the vacuum pressure respectively, are connected. Referring to FIG. 4*c*, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated and/or corrugated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, and/or the support. The radiation resistance sheet may include a portion having a degree of deformation resistance less than that of at least one of the plate and the support. The plate may include a portion having a degree of deformation resistance less than that of the support. The conductive resistance sheet may include a portion having conductive heat transfer resistance greater than that of at least one of the plate, the radiation resistance sheet, and/or the support. The radiation resistance sheet may include a portion having radiation heat transfer resistance greater than that of at least one of the plate, the conductive resistance sheet, and/or the support. The support may include a portion having heat transfer resistance greater than that of the plate. For example, at least one of the plate, the conductive resistance sheet, and/or the connection frame may include stainless steel material. The radiation resistance sheet may include aluminum. The support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be at least any one of the following examples or a combination of two or more examples.

While the exhaust process is being performed, an outgassing process, which is a process in which a gas of the vacuum space is discharged, and/or a potential gas remaining in the components of the vacuum adiabatic body is discharged, may be performed. As an example of the outgassing process, the exhaust process may include at least one of heating and/or drying the vacuum adiabatic body, providing a vacuum pressure to the vacuum adiabatic body, and/or providing a getter to the vacuum adiabatic body. In this case, it is possible to promote the vaporization and exhaust of the potential gas remaining in the component provided in the vacuum space. The exhaust process may include a process of cooling the vacuum adiabatic body. The cooling process may be performed after the process of heating and/or drying the vacuum adiabatic body is performed. The process of heating and/or drying the vacuum adiabatic body process of providing the vacuum pressure to the vacuum adiabatic body may be performed together. The process of heating and/or drying the vacuum adiabatic body and the process of providing the getter to the vacuum adiabatic body may be performed together. After the process of heating and/or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating and/or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time Δ1 during which the process of heating and/or drying the vacuum adiabatic body is performed, a time Δt2 during which the process of maintaining the getter in the vacuum adiabatic body is performed, and/or a time Δt3 during which the process of cooling the vacuum adiabatic body is performed. Examples of times Δt1, Δt2, and Δt3 are as follows. The present disclosure may be any one of the following examples or a combination of two or more examples. In the vacuum adiabatic body vacuum exhaust process, the time Δt1 may be a time t1*a* or more and a time t1*b* or less. As a first example, the time t1*a* may be greater than or equal to about 0.2 hr and less than or equal to about 0.5 hr. The time t1*b* may be greater than or equal to about 1 hr and less than or equal to about 24.0 hr. Preferably, the time Δt1 may be about 0.3 hr or more and about 12.0 hr or less. Preferably, the time Δt1 may be about 0.4 hr or more and about 8.0 hr or less. More preferably, the time Δt1 may be about 0.5 hr or more and about 4.0 hr or less. In this case, even if the Δt1 is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support and/or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support and/or the radiation resistance sheet may be disposed in the vacuum space. The use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, and/or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time t1*a* may be greater than or equal to about 0.5 hr and less than or equal to about 1 hr. The time t1*b* may be greater than or equal to about 24.0 hr and less than or equal to about 65 hr. Preferably, the time Δt1 may be about 1.0 hr or more and about 48.0 hr or less. Preferably, the time Δt1 may be about 2 hr or more and about 24.0 hr or less. More preferably, the time Δt1 may be about 3 hr or more and about 12.0 hr or less. In this case, it may be the vacuum adiabatic body that needs to maintain the Atl as long as possible. In this case, a case opposite to the examples described in the first example or a case in which the component exposed to the vacuum space is made of a thermoplastic material may be an example. A duplicated description will be omitted. In the vacuum exhaust process of the vacuum adiabatic body, the time Δt2 may be a time t2*a* or more and a time t2*b* or less. The time t2*a* may be greater than or equal to about 0.1 hr and less than or equal to about 0.3 hr. The time t2*b* may be greater than or equal to about 1 hr and less than or equal to about 5.0 hr. Preferably, the time Δt2 may be about 0.2 hr or more and about 3.0 hr or less. More preferably, the time Δt2 may be about 0.3 hr or more and about 2.0 hr or less. More preferably, the time Δt2 may be about 0.5 hr or more and about 1.5 hr or less. In this case, even if the time Δt2 is kept as short as possible, the sufficient outgassing through the getter may be applied to the vacuum adiabatic body. In the vacuum exhaust process of the vacuum adiabatic body, the time Δt3 may be a time t3*a* or more and a time t3*b* or less. The time t3*a* may be greater than or equal to about 0.2 hr and less than or equal to about 0.8 hr. The time t3*b* may be greater than or equal to about 1 hr and less than or equal to about 65.0 hr. Preferably, the time Δt3 may be about 0.2 hr or more and about 48.0 hr or less. Preferably, The time Δt3 may be about 0.3 hr or more and about 24.0 hr or less. More preferably, the time Δt3 may be about 0.4 hr or more and about 12.0 hr or less. More preferably, the time Δt3 may be about 0.5 hr or more and about 5.0 hr or less. After the heating and/or drying process is performed during the exhaust process, the cooling process may be performed. For example, when the heating and/or drying process is performed for a long time, the time Δt3 may be long. The vacuum adiabatic body according to the present disclosure may be manufactured so that the time Δt1 is greater than the time Δt2, the time Δt1 is less than or equal to the time Δt3, and/or the time Δt3 is greater than the time Δt2. Preferably, the following relational expression is satisfied: Δt2<Δt1Δt3. The vacuum adiabatic body according to an embodiment may be manufactured so that the relational expression: Δt1+Δt2+Δt3 may be greater than or equal to about 0.3 hr and less than or equal to about 70 hr, be greater than or equal to about 1 hr and less than or equal to about 65 hr, or be greater than or equal to about 2 hr and less than or equal to about 24 hr. Preferably, the relational expression: Δt1+Δt2+Δt3 may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E-6 Torr. Preferably, the minimum value of the vacuum pressure may be greater than about 1.8E-6 Torr and less than or equal to about 1.0E-4 Torr, be greater than about 0.5E-6 Torr and less than or equal to about 1.0E-4 Torr, or be greater than about 0.5E-6 Torr and less than or equal to about 0.5E-5 Torr. More preferably, the minimum value of the vacuum pressure may be greater than about 0.5E-6 Torr and less than about 1.0E-5 Torr. As such, the limitation in which the minimum value of the vacuum pressure provided during the exhaust process is because, even if the pressure is reduced through the vacuum pump during the exhaust process, the degree of the decrease of vacuum pressure is slowed below a certain level. As an embodiment, after the exhaust process is performed, the vacuum pressure of the vacuum space may be maintained at a pressure greater than or equal to about 1.0E-5 Torr and less than or equal to about 5.0E-1 Torr. The maintained vacuum pressure may be greater than or equal to about 1.0E-5 Torr and less than or equal to about 1.0E-1 Torr, be greater than or equal to about 1.0E-5 Torr and less than or equal to about 1.0E-2 Torr, be greater than or equal to about 1.0E-4 Torr and less than or equal to about 1.0E-2 Torr, be greater than or equal to about 1.0E-5 Torr, and/or less than or equal to about 1.0E-3 Torr. As a result of predicting the change in vacuum pressure with an accelerated experiment of two example products, one product may be provided so that the vacuum pressure is maintained below about 1.0E-04 Torr even after about 16.3 years, and the other product may be provided so that the vacuum pressure is maintained below about 1.0E-04 Torr even after about 17.8 years. As described above, the vacuum pressure of the vacuum adiabatic body may be used industrially only when it is maintained below a predetermined level even if there is a change over time or aged deterioration.

FIG. 5*a* is a graph of an elapsing time and pressure in the exhaust process according to an example, and FIG. 5*b* is a view explaining results of a vacuum maintenance test in the acceleration experiment of the vacuum adiabatic body of the refrigerator having an internal volume of about 128 liters. Referring to FIG. 5*b*, it is seen that the vacuum pressure gradually increases according to the aging. For example, it is confirmed that the vacuum pressure is about 6.7E-04 Torr after about 4.7 years, about 1.7E-03 Torr after about 10 years, and about 1.0E-02 Torr after about 59 years. According to these experimental results, it is confirmed that the vacuum adiabatic body according to the embodiment is sufficiently industrially applicable.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (ek) was measured when the gap in the vacuum space 50 has three values of about 3 mm, about 4.5 mm, and about 9 mm. The gap in the vacuum space 50 is defined as follows. When the radiation resistance sheet 32 exists inside the vacuum space 50, the gap may be a distance between the radiation resistance sheet 32 and the plate adjacent thereto. When the radiation resistance sheet 32 does not exist inside the vacuum space 50, the gap may be a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E-1 Torr even when the size of the gap is about 3 mm. Meanwhile, it was seen that the point at which reduction in adiabatic effect caused by the gas conduction heat is saturated, even though the vacuum pressure decreases, is a point at which the vacuum pressure is approximately 4.5E-3 Torr. The vacuum pressure of about 4.5E-3 Torr may be defined as the point at which the reduction in adiabatic effect caused by the gas conduction heat is saturated. Also, when the effective heat transfer coefficient is about 0.01 W/mK, the vacuum pressure is about 1.2E-2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E-1 Torr, or be greater than about 2.65E-1 Torr and less than about 5E-1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E-1 Torr, or be greater than about 1.2E-2 Torr and less than about 5E-1 Torr. As another example, the support may include at least one of a bar, a connection plate, or a support plate, and when the gap of the vacuum space is greater than or equal to about 9 mm, the vacuum pressure may be greater than or equal to A and less than about 1.0E-1 Torr, or be greater than about 4.5E-3 Torr and less than about 5E-1 Torr. Here, the A may be greater than or equal to about 1.0E-6 Torr and less than or equal to about 1.0E-5 Torr. The A may be greater than or equal to about 1.0-5 Torr and less than or equal to about 1.0E-4 Torr. When the support includes a porous material or a filler, the vacuum pressure may be greater than or equal to about 4.7E-2 Torr and less than or equal to about 5E-1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7*a*, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7*b*, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7*c*, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7*d*, the vacuum space expansion portion 51 may include an X-direction expansion portion 51*a* and a Y-direction expansion portion 51*b* of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7*e*, the side plate may provide the vacuum space extension portion extending in the plurality of directions. The vacuum space expansion portion may reinforce the adiabatic performance of the side portion of the vacuum adiabatic body. Referring to FIG. 7*f*, the first plate may provide the vacuum space extension portion extending in the plurality of directions. The vacuum space expansion portion may reinforce the adiabatic performance of the side portion of the vacuum adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a pre-molded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or scaling the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8*a* to 8*f*, another adiabatic body may include a peripheral adiabatic body. The peripheral adiabatic body may be disposed on at least a portion of a peripheral portion of the vacuum adiabatic body, a peripheral portion of the first plate, a peripheral portion of the second plate, and the side plate. The peripheral adiabatic body disposed on the peripheral portion of the first plate or the peripheral portion of the second plate may extend to a portion at which the side plate is disposed or may extend to the outside of the side platc. The peripheral adiabatic body disposed on the side plate may extend to a portion at which the first plate or may extend to the outside of the first plate or the second plate. Referring to FIGS. 8*g* to 8*h*, another adiabatic body may include a central adiabatic body. The central adiabatic body may be disposed on at least a portion of a central portion of the vacuum adiabatic body, a central portion of the first plate, or a central portion of the second plate.

Referring to FIG. 8*a*, the peripheral adiabatic body 92 may be placed on the peripheral portion of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the peripheral portion of the first plate. Referring to FIG. 8*b*, the peripheral adiabatic body may be placed on the peripheral portion of the second plate. The peripheral adiabatic body may be in contact with the second plate. The peripheral adiabatic body may be separated from the second plate or further extend from the second plate (indicated by dotted lines). The peripheral portion adiabatic body may improve the adiabatic performance of the peripheral portion of the second plate. Referring to FIG. 8*c*, the peripheral adiabatic body may be disposed on the peripheral portion of the side plate. The peripheral adiabatic body may be in contact with the side plate. The peripheral adiabatic body may be separated from the side plate or further extend from the side plate. The peripheral adiabatic body may improve the adiabatic performance of the peripheral portion of the side plate Referring to FIG. 8*d*, the peripheral adiabatic body 92 may be disposed on the peripheral portion of the first plate. The peripheral adiabatic body may be placed on the peripheral portion of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the peripheral portion of the first plate constituting the vacuum space expansion portion. Referring to FIGS. 8*e* and 8*f*, in the peripheral adiabatic body, the vacuum space extension portion may be disposed on a peripheral portion of the second plate or the side plate. The same explanation as in FIG. 8*d* may be applied. Referring to FIG. 8*g*, the central adiabatic body 91 may be placed on a central portion of the first plate. The central adiabatic body may improve adiabatic performance of the central portion of the first plate. Referring to FIG. 8*h*, the central adiabatic body may be disposed on the central portion of the second plate. The central adiabatic body may improve adiabatic performance of the central portion of the second plate.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9*a*, the second plate may include the extension portion extending to the peripheral portion of the second plate. Here, the extension portion may further include a portion extending backward. Referring to FIG. 9*b*, the side plate may include the extension portion extending to a peripheral portion of the side plate. Here, the extension portion may be provided to have a length that is less than or equal to that of the extension portion of the second plate. Here, the extension portion may further include a portion extending backward. Referring to FIG. 9*c*, the first plate may include the extension portion extending to the peripheral portion of the first plate. Here, the extension portion may extend to a length that is less than or equal to that of the extension portion of the second plate. Here, the extension portion may further include a portion extending backward.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10*a*, the second plate may include the branched portion 205. The branched portion may be provided in plurality, which are spaced apart from each other. The branched portion may include a third portion 203 of the second plate. Referring to FIG. 10*b*, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10*c*, the first plate may include the branched portion 104. The branched portion may further extend from the second portion 102 of the first plate. The branched portion may extend toward the peripheral portion. The branched portion 104 may be bent to further extend. A direction in which the branched portion extends in FIGS. 10*a*, 10*b*, and 10*c* may be the same as at least one of the extension directions of the extension portion described in FIG. 10.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component scaling process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with a plate is as follows. Any one or two or more examples among following examples of the present disclosure will be described. The vacuum adiabatic body component preparation process may include a process of manufacturing the plate. Before the vacuum adiabatic body vacuum exhaust process is performed, the process of manufacturing the plate may be performed. Optionally, the plate may be manufactured by a metal sheet. For example, a thin and wide plate may be manufactured using plastic deformation. Optionally, the manufacturing process may include a process of molding the plate. The molding process may be applied to the molding of the side plate or may be applied to a process of integrally manufacturing at least a portion of at least one of the first plate and the second plate, and the side plate. For example, the molding may include drawing. The molding process may include a process in which the plate is partially seated on a support. The molding process may include a process of partially applying force to the plate. The molding process may include a process of seating a portion of the plate on the support a process of applying force to the other portion of the plate. The molding process may include a process of deforming the plate. The deforming process may include a process of forming at least one or more curved portions on the plate. The deforming process may include a process of changing a curvature radius of the plate or a process of changing a thickness of the plate. As a first example, the process of changing the thickness may include a process of allowing a portion of the plate to increase in thickness, and the portion may include a portion extending in a longitudinal direction of the internal space (a first straight portion). The portion may be provided in the vicinity of the portion at which the plate is seated on the support in the process of molding the plate. As a second example, the process of changing the thickness may include a process of reducing a thickness of a portion of the plate, and the portion may include a portion extending in a longitudinal direction of the internal space (a second straight portion). The portion may be provided in the vicinity of a portion to which force is applied to the plate in the process of molding the plate. As a third example, the process of changing the thickness may include a process of reducing a thickness of a portion of the plate, and the portion may include a portion extending in a height direction of the internal space (the second straight portion). The portion may be connected to the portion extending in the longitudinal direction of the internal space of the plate. As a fourth example, the process of changing the thickness may include a process of allowing a portion of the plate to increase in thickness, and the portion may include at least one of a portion to which the side plate extends in the longitudinal direction of the internal space and a curved portion provided between the portions extending in the height direction of the internal space (a first curved portion). The curved portion may be provided at the portion seated on the support of the plate or in the vicinity of the portion in the process of molding the plate. As a fifth example, the process of changing the thickness may include a process of allowing a portion of the plate to decrease in thickness, and the portion may include at least one of a portion to which the side plate extends in the longitudinal direction of the internal space and a curved portion provided between the portions extending in the height direction of the internal space (a second curved portion). The curved portion may be provided in the vicinity of a portion to which force is applied to the plate in the process of molding the plate. The deforming process may be any one of the above-described examples or an example in which at least two of the above-described examples are combined.

The process associated with the plate may selectively include a process of washing the plate. An example of a process sequence associated with the process of washing the plate is as follows. The present disclosure may be any one of the following examples or a combination of two or more examples. Before the vacuum adiabatic body vacuum exhaust process is performed, the process of washing the plate may be performed. After the process of manufacturing the plate is performed, at least one of the process of molding the plate and the process of washing the plate may be performed. After the process of molding the plate is performed, the process of washing the plate may be performed. Before the process of molding the plate is performed, the process of washing the plate may be performed. After the process of manufacturing the plate is performed, at least one of a process of providing a component coupling portion to a portion of the plate or the process of washing the plate may be performed. After the process of providing the component coupling portion to a portion of the plate is performed, the process of washing the plate may be performed.

The process associated with the plate selectively include the process of providing the component coupling portion to the plate. An example of a process sequence associated with the process of providing the component coupling portion to the plate is as follows. The present disclosure may be any one of the following examples or a combination of two or more examples. Before the vacuum adiabatic body vacuum exhaust process is performed, a process of providing the component coupling portion to a portion of the plate may be performed. For example, the process of providing the component coupling portion may include a process of manufacturing a tube provided to the component coupling portion. The tube may be connected to a portion of the plate. The tube may be disposed in an empty space provided in the plate or in an empty space provided between the plates. As another example, the process of providing the component coupling portion may include a process of providing a through-hole in a portion of the plate. For another example, the process of providing the component coupling portion may include a process of providing a curved portion to at least one of the plate or the tube.

The process associated with the plate may optionally include a process for scaling the vacuum adiabatic body component associated with the plate. An example of a process sequence associated with the process of sealing the vacuum adiabatic body component associated with the plate is as follows. The present disclosure may be any one of the following examples or a combination of two or more examples. After the process of providing the through-hole in the portion of the plate is performed, at least one of a process of providing a curved portion to at least a portion of the plate or the tube or a process of providing a seal between the plate and the tube may be performed. After the process of providing the curved portion to at least a portion of at least one of the plate or the tube is performed, the process of sealing the gap between the plate and the tube may be performed. The process of providing the through-hole in the portion of the plate and the process of providing the curved portion in at least a portion of the plate and the tube may be performed at the same time. The process of providing a through-hole in a part of the plate and the process of providing the seal between the plate and the tube may be performed at the same time. After the process of providing the curved portion to the tube is performed, the process of providing a through-hole in the portion of the plate may be performed. Before the vacuum adiabatic body vacuum exhaust process is performed, a portion of the tube may be provided and/or sealed to the plate, and after the vacuum adiabatic body vacuum exhaust process is performed, the other portion of the tube may be sealed.

When at least a portion of the plate is used to be integrated with a heat transfer resistor, the example of the process associated with the plate may also be applied to the example of the process of the heat transfer resistor.

Optionally, the vacuum adiabatic body may include a side plate connecting the first plate to the second plate. Examples of the side plate are as follows. The present disclosure may be any one of the following examples or a combination of two or more examples. The side plate may be provided to be integrated with at least one of the first or second plate. The side plate may be provided to be integrated with any one of the first and second plates. The side plate may be provided as any one of the first and second plates. The side plate may be provided as a portion of any one of the first and second plates. The side plate may be provided as a component separated from the other of the first and second plates. In this case, optionally, the side plate may be provided to be coupled or sealed to the other one of the first and second plates. The side plate may include a portion having a degree of strain resistance, which is greater than that of at least a portion of the other one of the first and second plates. The side plate may include a portion having a thickness greater than that of at least a portion of the other one of the first and second plates. The side plate may include a portion having a curvature radius less than that of at least a portion of the other one of the first and second plates.

In a similar example to this, optionally, the vacuum adiabatic body may include a heat transfer resistor provided to reduce a heat transfer amount between a first space provided in the vicinity of the first plate and a second space provided in the vicinity of the second plate. Examples of the heat transfer resistor are as follows. The present disclosure may be any one of the following examples or a combination of two or more examples. The heat transfer resistor may be provided to be integrated with at least one of the first or second plate. The heat transfer resistor may be provided to be integrated with any one of the first and second plates. The heat transfer resistor may be provided as any one of the first and second plates. The heat transfer resistor may be provided as a portion of any one of the first and second plates. The heat transfer resistor may be provided as a component separated from the other one of the first and second plates. In this case, optionally, the heat transfer resistor may be provided to be coupled or sealed to the other one of the first and second plates. The heat transfer resistor may include a portion having a degree of heat transfer resistance, which is greater than that of at least a portion of the other one of the first and second plates. The heat transfer resistor may include a portion having a thickness less than that of at least a portion of the other one of the first and second plates. The heat transfer resistor may include a portion having a curvature radius less than that of at least a portion of the other one of the first and second plates. The heat transfer resistor may include a portion having a curvature radius less than that of at least a portion of the other one of the first and second plates.

The contents described in FIGS. 1 to 11 may be applied to all or selectively applied to the embodiments described with reference to the drawings below.

The installation of the tube will be schematically described.

FIG. 12 is a perspective view in which a tube is installed in a vacuum adiabatic body. Here, (a) of FIG. 12 is a view illustrating a state before the tube is coupled, and (b) of FIG. 12 is a view illustrating a state after the tube is coupled.

Referring to FIG. 12, the vacuum adiabatic body according to one or more embodiments may have a tube 40. The tube 40 may be a tube for exhausting a fluid of the vacuum space 50. The tube 40 may be a tube for a getter, in which a getter for gas adsorption is supported. The tube 40 may serve as an exhaust port and a getter port.

Optionally, a thickness of the tube may be greater than that of the first plate 10. The thickness of the tube may be provided to be thicker than that of the second plate 20. The thickness of the tube may be provided to a thickness that is sufficient to withstand compression required for sealing the tube. The sealing may be performed through pinch-off. The tube may have a sufficient wall thickness.

Optionally, the tube may be provided as a circular or oval hollow tube made of a metal. The tube may be sealed after the exhaust or after inserting the getter. The tube may be sealed through pressure welding. The tube may be sealed by deforming the tube. The tube may be sealed through pinching-off. The tube may be made of copper (CU) for easy deformation. Copper having strength less than that of stainless steel may be used as the tube. Since the easily deformable copper is used, the pinch-off process may be smoothly performed. In addition, it is possible to reliably provide the seal. Optionally, the flange 42 may have a predetermined height portion HL extending in a height direction of the vacuum space. The curvature portion may guide the tube 40. The curvature portion may allow the tube to be conveniently inserted into the through-hole 41. Examples of the aforementioned tube may be ports such as an exhaust port or a getter port.

FIG. 13 is a view for explaining a method of processing the through-hole of the first plate.

Referring to FIG. 13, a hole may be processed in the first plate 10 (S1). Thereafter, the hole may be pressed using a pressing tool having a diameter greater than that of the hole (S2).

Optionally, to smoothly form the flange 42 in the burring process, the following method may be applied. It may provide small force compared to the force applied in the general burring process. The force may be applied gradually for a longer time than that required for the general burring process. A first curvature may be processed in the peripheral portion of the hole provided by the piercing process between the piercing process and the burring process. During the burring process, a support having a groove corresponding to a desired shape of the burr may be provided on a surface on which the burr is generated. It may provide the flange 42 having a small curvature radius R through the above process. A portion at which the curvature radius is formed may be referred to as a curvature portion. Examples of the aforementioned tube may be ports such as an exhaust port or a getter port.

FIG. 14 is a cross-sectional view taken along line 1-1' of FIG. 12*b*. For reference, FIG. 14 illustrates a state in which the vacuum adiabatic body is applied to a door. A cross-section of the tube and its related configuration will be described with reference to FIG. 14.

In one or more embodiments, the first plate 10 may have a thickness of at least about 0.1 mm or more. Thus, it may secure rigidity to obtain process stability when inserting the tube 40. The thickness of the first plate 10 may be about 0.1 mm. The second plate 20 may have a thickness of about 0.5 mm or more. The thin first plate 10 may be provided because conductive heat decreases. If the first plate 10 is thin, there may be a disadvantage that it is vulnerable to deformation. When the tube 40 is inserted into the through-hole 41, the first plate 10 in the vicinity of the through-hole 41 may be deformed. Optionally, A height HI of the flange 42 may be provided to be about 1 mm or more and about 3 mm or less. When the height of the flange 42 exceeds about 3 mm, there is a high risk that the heat transfer resistor 32 and the flange 42 are in contact with each other. Optionally, the curvature radius R of the curvature portion of the flange 42 defining the through-hole 41 may be less than that of each of all bent portions provided on the first plate 10. The curvature radius R of the flange 42 defining the through-hole 41 may be less than that of each of all bent portions provided on the second plate 20. Optionally, the tube may be insulated with the additional adiabatic body 90. The additional adiabatic body 90 may insulate a gap between the tube 40 and the first space and/or a gap between the tube 40 and the second space. Examples of the aforementioned tube may be ports such as an exhaust port or a getter port.

FIG. 15 illustrates an example in which a flange extends toward the outside of the vacuum space. other structure and function are same with the another one or more embodiments.

FIGS. 16 to 18 are views for explaining a method for manufacturing a vacuum adiabatic body.

Referring to FIG. 16, in one or more embodiments, the second plate 20 may be processed to form an accommodation space. The first plate 10 and the second plate 20 may be fastened to each other. The side plate 15 and the second plate 20 may be bent to each other to form the accommodation space. The side plate 15 and the second plate 20 may extend in different directions from each other.

Referring to FIG. 17, in one or more embodiments, at least one of the first support 301 and the second support 302 may provide a resin as a material. Through this, the thermal conductivity can be lowered. The outer panel and the inner panel may also provide a resin as a material in order to lower the thermal conductivity.

Optionally, at least one of the first support 301 and the second support 302 may be provided as at least two spaced apart components. The figure illustrates that the second support 302 is made of components that are spaced apart from each other. Each component of the first support 301 and each component of the second support 302 may be alternately connected to each other. A component of the second support 302 may be placed between two components of the first support 301 that are spaced apart from each other.

Optionally, a heat transfer resistor 32 may be placed in the middle of the first and second supports 30. The position of the heat transfer resistor 32 may be fixed by fastening the first and second supports 301 and 302. In the vacuum adiabatic body component assembling step S2, the support 30, the heat transfer resistor, and the through-component may be assembled to the plate. Here, the heat transfer resistor may include the radiation resistance sheet 32. The heat transfer resistor may include other components.

Referring to FIG. 18, optionally, after the first and second supports 301 and 302 and the heat transfer resistor are fastened, the assembly of the support 30 and the heat transfer resistor 32 may be placed in the accommodation space. After the assembly is placed in the accommodation space, the first plate 10 may be placed on the second plate 20. The second plate 20 and the first plate 10 may be sealed with each other in the second portion 152 of the side plate. For scaling, scaling may be performed.

Optionally, in the vacuum adiabatic body component sealing step S3, the vacuum space 50 may be sealed with respect to the first space and the second space. The vacuum adiabatic body component sealing step S3 may be performed by sealing the first plate 10 and the second plate 20.

Hereinafter, the strength reinforcement portion of the first plate will be described.

Optionally, if the first plate 10 is thin, side effects may occur. If the first plate is thin, the first plate may be vulnerable to deformation. When the plates are welded, temporary vacuum may be applied to bring the plate members into close contact. The temporary vacuum may be different from the vacuum process of evacuating the vacuum space 50. The first plate may be vulnerable to the deformation when the temporary vacuum is applied. The first plate may be vulnerable to the deformation at a portion where the support is discontinuous. Deformation of the first plate 10 may cause welding defects. This is because the contact of the two plates may be spaced apart from each other. The welding defect is an important problem leading to the disposal of the vacuum adiabatic body.

FIG. 19 is a perspective view illustrating a vacuum adiabatic body according to the embodiment.

Referring to FIG. 19, in one or more embodiments, the vacuum adiabatic body may include a strength reinforcement portion 11 in the first plate 10. The strength reinforcement portion 11 may reinforce the strength of the first plate 10. The strength reinforcement portion 11 may reinforce the strength of the vacuum adiabatic body. The strength reinforcement portion 11 may prevent deformation of the first plate 10. The strength reinforcement portion 11 may be provided on the peripheral portion of the first plate. The strength reinforcement portion 11 may have a portion extending along the extending direction of the edge of the first plate. The strength reinforcement portion may be provided on the long side of the first plate.

Optionally, the first plate and the support may have areas aligned in a thickness direction of the vacuum space. The strength reinforcement portion may be provided correspondingly between the two components providing support. The strength reinforcement portion may be provided to be spaced apart from at least two places of the first plate. The strength reinforcement portion may be provided to be spaced apart from six places of the first plate. The second support 302 may be divided into at least two components. The second support 302 may include first to fourth components 3021, 3022, 3023, and 3024. Of course, the second support may have more or fewer components. The spacing between the components 3021, 3022, 3023, and 3024 may have a different characteristic from the grid inside the component. The characteristic may include at least one of a difference in length between the grid and the gap, the presence or absence of a support structure in the short side direction of the first plate, and/or the presence or absence of discontinuous support. Due to the above characteristics, the deformation of the first plate may make the gap between the two components more vulnerable. The distance between the two components may extend in one direction. The strength reinforcement portion 11 may be provided in the peripheral portion of the first plate corresponding to the spacing between the two components. The strength reinforcement portion 11 may suppress the propagation of the deformation of the first plate occurring in the gap between the two components. The strength reinforcement portion 11 may suppress the propagation of the deformation of the first plate to the seal (611 in FIG. 20). The strength reinforcement portion may not be disposed on the curved peripheral portion of the first plate. A gap between the two components may not exist in the curved peripheral portion of the first plate. The strength reinforcement portion may be provided on a straight peripheral portion of the first plate. When viewed from the first plate, the strength reinforcement portion 11 may be placed inside the seal 611. A gap between the strength reinforcement portion 11 and the seals 611 may be 1 millimeter or more. There may be a gap between the strength reinforcement portion 11 and the seal 611. Due to the gap, the shape of the strength reinforcement portion itself may not affect the seal. The seal may be a weld. The strength reinforcement portion 11 may improve close contact performance during the sealing process of the two members to be sealed. The strength reinforcement portion 11 can improve the close contact performance of the two members to be sealed after the sealing process. The strength reinforcement portion 11 may be provided on the plate in the vacuum adiabatic body component preparation step.

Optionally, the strength reinforcement portion 11 may increase the flatness of the first plate in an area corresponding to the seal 611. The seal may be an area to which at least two members are fastened. The improvement of the flatness of the first plate corresponding to the seal may improve the degree of close contact between the two members to be sealed. The improvement of the flatness of the first plate corresponding to the seal may improve the reliability of the sealing operation for providing the seal. As a result, the strength reinforcement portion 11 can improve sealing reliability and vacuum holding performance of the vacuum adiabatic body.

Optionally, the positioning state of the support 31 may be checked by using the strength reinforcement portion 11. The support 31 can be placed in an accurate position by using the strength reinforcement portion 11. A portion where the strength reinforcement portion 11 is located may be revealed as a mark different from other areas of the first plate. The operator can check the position of the strength reinforcement portion 11 with his/her senses. The strength reinforcement portion may correspond to a gap between the components of the support. The operator can check the position of the gap between the supports through the strength reinforcement portion. The operator can check whether the gap between the supports is in the correct position. For example, the support 31 may be positioned to be tilted toward one side from the inside of the vacuum space 50. In this case, the strength reinforcement portion may be pushed to one side. The operator can check the inclination of the support or the gap between components by using the inclination of the strength reinforcement portion. The operator can pick up the first plate and rework the support. The operator can work more accurately when the strength reinforcement portion 11 corresponds to a specific position of the support (for example, 114 in FIG. 21).

FIG. 20 is a view illustrating in detail the relationship between the strength reinforcement portion and the configuration. The strength reinforcement portion 111 according to an example will be described in detail with reference to FIG. 20.

Optionally, the strength reinforcement portion 111 may protrude from the first plate. The strength reinforcement portion 111 may extend upward from the first plate. The strength reinforcement portion 111 may be provided by forming a first plate. The strength reinforcement portion 111 may be placed on the outside of the support. The strength reinforcement portion 111 may correspond to the support in the thickness direction of the vacuum space. The correspondence between the other strength reinforcement components and the supports may be the same. The strength reinforcement portion 111 may be placed inside the seal 611. Through this, it is possible to suppress the propagation of the deformation of the inner area of the first plate toward the seal. The strength reinforcement portion 111 may be placed between the seal 611 and the outermost support. The strength reinforcement portion 111 may be placed in the center of the seal 611 and/or the outermost support. The major axis of the strength reinforcement portion 111 may be placed perpendicular to the gap between the two components. The width L3 of the strength reinforcement portion 111 may be shorter than the length L2. The width L3 of the strength reinforcement portion 111 may be greater than the width L4 of the seal. The width L3 of the strength reinforcement portion 111 may be smaller than the width L5 of the support frame. The width L3 of the strength reinforcement portion 111 may be greater than the thickness (t in FIG. 22(*a*)) of the strength reinforcement portion 111. The width L3 of the strength reinforcement portion 111 may be 1-3 millimeters, preferably 2 millimeters. The thickness of the strength reinforcement portion 111 (t in FIG. 22(*a*)) may be thicker than the thickness of the first plate. The length L2 of the strength reinforcement portion 111 may be longer than the distance L1 between the support components. The length L2 of the strength reinforcement portion 111 may be less than three times the distance L1 between the support components. The length L2 of the strength reinforcement portion 111 may be 1.5 to 2.5 times the distance L1 between the support components. The action of the strength reinforcement portion may be smooth by the scale.

FIG. 21 is a view illustrating an embodiment of the strength reinforcement portion according to the location. Any one of the strength reinforcement portions illustrated in FIG. 21 may not exclude the other strength reinforcement portion illustrated in FIG. 21. At least one of the strength reinforcement portions illustrated in FIG. 21 may be provided. At least one of the strength reinforcement portions illustrated in FIG. 21 may be provided on the first plate. At least one of the reinforcement portions illustrated in FIG. 21 may be placed in a gap between the two components in different positions. The description of any one of the strength reinforcement portions illustrated in FIG. 21 may be applied to the description of other strength reinforcement portions of the present specification.

Referring to FIG. 21, the description as described in FIG. 20 may be applied to the first strength reinforcement portion 111. At least one of the second to fifth strength reinforcement portions 112, 113, 114, and 115 may be provided.

Optionally, the second strength reinforcement portion 112 may be placed inside the grid area of the support. The second strength reinforcement portion 112 may be disposed to correspond to any corner of the inner area of the grid of the support. The second strength reinforcement portion 112 may be placed in contact with any corner of the inner area of the grid of the support. The second strength reinforcement portion 112 may be placed in contact with the side surface of the support. The second strength reinforcement portion 112 may be in contact with both ends of any one corner of the grid of the support. The second strength reinforcement portion 112 may be in contact with any one corner of the grid of the support. The second strength reinforcement portion 112 may be in contact with at least one end of the corner. FIG. 22(*e*) is a cross-sectional view taken along line 1-1' of FIG. 21. Referring to FIG. 22(*e*), the second strength reinforcement portion 112 may protrude downward of the first plate. A side surface of the second strength reinforcement portion 112 may be in contact with the support. The second strength reinforcement portion 112 may be provided on at least one of the opposite sides of the first plate. The second strength reinforcement portion 112 may be provided on opposite sides of the first plate, respectively. The second strength reinforcement portion 112 may smoothly guide the position of the support 31. The second strength reinforcement portion 112 may indirectly reinforce the strength of the first plate corresponding to the gap between the two components. The second strength reinforcement portion 112 may prevent propagation of the deformation of the first plate.

For the fifth strength reinforcement portion 115, the same description as that of the second strength reinforcement portion may be applied. The fifth strength reinforcement portion 115 may be different from the second strength reinforcement portion 112 only when fifth strength reinforcement portion is installed to correspond to the third component 3023.

Optionally, the third strength reinforcement portion 113 may be provided inside the first strength reinforcement portion 111. The third strength reinforcement portion 113 may have a shorter length than the first strength reinforcement portion 111. At least a portion of the third strength reinforcement portion 113 may correspond to the first portion 151 of the side plate. At least a portion of the first strength reinforcement portion 111 may correspond to the second portion 152 of the side plate. The first portion 151 of the side plate may be continuous with the second portion 152 of the side plate. The first portion 151 of the side plate may be placed inward compared to the second portion 152 of the side plate.

Optionally, the fourth strength reinforcement portion 114 may be placed in an area of the first plate corresponding to the gap between the two components. At least one end of the fourth strength reinforcement portion 114 may be in contact with at least one corner of the second component 3022 and the third component 3023. The fourth strength reinforcement portion 114 may directly reinforce the strength of the first plate corresponding to the gap between the two components. The fourth strength reinforcement portion 114 may prevent the occurrence of deformation of the first plate. The fourth strength reinforcement portion 114 may prevent propagation of deformation of the first plate.

FIG. 22 is a view illustrating another embodiment of another strength reinforcement portion according to the method for providing the strength reinforcement portion. Any one of the strength reinforcement portions illustrated in FIG. 22 may not exclude the other strength reinforcement portion illustrated in FIG. 22. At least one of any one of the strength reinforcement portions illustrated in FIG. 22 may be provided. At least one of the strength reinforcement portions illustrated in FIG. 22 may be provided on the first plate. The description of any one of the strength reinforcement portions illustrated in FIG. 22 may be applied to the description of other strength reinforcement portions of the present specification.

FIG. 22(*a*) illustrates the formed strength reinforcement portion 11*a* protruding or processing in at least one direction. Optionally, the formed strength reinforcement portion 11*a* may be provided by a method exemplified by at least one of pressing, forming, and hitting. The formed strength reinforcement portion 11*a* may increase the moment of inertia of the first plate. The shape of the formed strength reinforcement portion may be exemplified by various shapes such as a straight line, a circle, an oval, a rectangle, and/or a polygon.

The formed strength reinforcement portion 11*a* may preferably be exemplified to protrude upward. The formed strength reinforcement portion 11*a* may facilitate the formation of the seal 611.

FIG. 23 is a view for explaining the action of the formed strength reinforcement portion 11*a*. Referring to FIG. 23, optionally, another deformation portion 154 having a different thickness may be provided in the member sealed with the first plate. The deformation portion may occur for any one of the reasons of forming the plate and reinforcing the strength of the plate. Another deformation portion 154 may be provided at a boundary between the first and second side plates 151 and 152. Another deformation portion 154 may be thicker than other portions of the second plate 20 and/or the side plate 15. Another deformation portion 154 may protrude upward. The formed strength reinforcement portion 11*a* formed upward may accommodate another deformation portion 154 in the formed inside. In the seal 611, the first plate and the side plate 15 may be in close contact with each other. The formed strength reinforcement portion 11*a* may help to position the first plate and the second plate. The formed strength reinforcement portion 11*a* may reduce the influence of high heat on the support during welding of the seal 611. The formed strength reinforcement portion 11*a* may contribute to the quality improvement of the support. The formed strength reinforcement portion 11*a* may move a position where the first plate contacts the side plate to the outside. The strength reinforcement portion 11*a* may lengthen the heat transfer path of the vacuum adiabatic body. The heat insulating effect of the vacuum adiabatic body can be improved by the lengthened heat transfer path of the strength reinforcement portion.

Optionally, the formed strength reinforcement portion 11*a* may not be provided in FIG. 23 (*a*). In this case, a gap d may occur between the first plate and the side plate 15 in the seal 611. The gap d may be a major cause of welding defects. In FIG. 23 (*b*), the formed strength reinforcement portion 11*a* may be provided. In this case, the first plate and the side plate 15 may be in close contact with each other in the seal 611. In the seal 611, the first plate and the second plate 20 may be in close contact with each other. When the formed strength reinforcement portion 11*a* protrudes downward, the gap d may be larger. The present disclosure does not exclude that the formed strength reinforcement portion protrudes downward.

It will be described again with reference to FIG. 22. FIG. 22 (*b*) illustrates different shape strength reinforcement portion 11*b* protruding upward. Optionally, the different shape strength reinforcement portion 11*b* may increase the thickness of the first plate. The different shape strength reinforcement portion 11*b* may be made of the same material to increase the moment of inertia of the first plate. FIG. 22 (*c*) illustrates a different material strength reinforcement portion 11*b*. The different material strength reinforcement portion 11*b* may increase the strength of the first plate. In the area of the different material strength reinforcement portion 11*b*, the rigidity of the first plate may be increased by using a high-strength material. FIG. 22 (*d*) illustrates the additional strength reinforcement portion 11*b* added a predetermined member upward. The additional strength reinforcement portion 11*b* may add another member to increase the thickness of the first plate. The additional strength reinforcement portion 11*b* may increase the moment of inertia of the first plate as a whole by adding the same or different materials to the first plate.

Optionally, the formed strength reinforcement portion and/or the different shape strength reinforcement portion may be provided as a non-separable type or integrally formed that is not separated from the first plate. The additional strength reinforcement portion may be separated from the first plate, or may be provided as a separate or additional type in which a predetermined member is added to the first plate. Various methods such as partial alloying, substitution, and/or welding may be applied to the different material strength reinforcement portion. At least one of a non-separable type, an integral type, a separate type, and/or an additional type can be applied to the different material strength reinforcement portion.

According to the present disclosure, it is possible to provide a vacuum adiabatic body that can be applied to real life.

What is claimed is:

1. A vacuum adiabatic body comprising:

a first plate;

a second plate;

a vacuum space disposed between the first plate and the second plate, and configured to be provided in a vacuum state; and a strength reinforcement formed onto the first plate configured to reinforce strength of the first plate.

2. The vacuum adiabatic body of claim 1, wherein the first plate is thinner than the second plate.

3. The vacuum adiabatic body of claim 1, wherein the strength reinforcement is provided on a periphery of the first plate, extends along an extending direction of an edge of the first plate, or is provided on a long side of the first plate.

4. The vacuum adiabatic body of claim 1, wherein the strength reinforcement is configured to prevent deformation of the first plate, inhibit propagation of the deformation of the first plate, or increase flatness of the first plate in an area of the first plate corresponding to a seal.

5. The vacuum adiabatic body of claim 1, further comprising:

a support configured to maintain the vacuum space, wherein a positioning state of the support is based on the strength reinforcement.

6. The vacuum adiabatic body of claim 1, further comprising:

a support configured to maintain the vacuum space, wherein the vacuum adiabatic body satisfies at least one of:

the strength reinforcement is disposed outside an area of the first plate on which the support is disposed, the strength reinforcement is disposed on an inside of a seal on the first plate, and the strength reinforcement is disposed between the seal and an outermost support.

7. The vacuum adiabatic body of claim 1, further comprising:

a support configured to maintain the vacuum space, wherein the strength reinforcement is disposed on at least one of:

an area of the first plate corresponding to outside of the support;

an area of the first plate corresponding to inside of a grid area of the support; and an area of the first plate corresponding to a gap between two components forming the support.

8. The vacuum adiabatic body of claim 7, wherein the vacuum adiabatic body satisfies at least one of:

a long axis of the strength reinforcement is disposed perpendicular to the gap between the two components forming the support, a width of the strength reinforcement is shorter than a length of the strength reinforcement, the width of the strength reinforcement is greater than a width of a seal on the first plate, the width of the strength reinforcement is less than a width of a frame forming part of the support, the width of the strength reinforcement is greater than a thickness of the strength reinforcement, the thickness of the strength reinforcement is greater than a thickness of the first plate, the length of the strength reinforcement is longer than the gap between the two components forming part of the support, and the length of the strength reinforcement is less than three times the gap between the two components forming part of the support.

9. The vacuum adiabatic body of claim 1, wherein the strength reinforcement includes at least one of:

a formed strength reinforcement formed in at least one direction, a different shape strength reinforcement protruding in at least one direction, a different material strength reinforcement including two different materials, and an additional strength reinforcement to which a predetermined member is added in at least one direction.

10. A method for manufacturing a vacuum adiabatic body to have a seal that seals a vacuum space between a first plate and a second plate, the method comprising:

manufacturing a component to be applied to the vacuum adiabatic body, and providing a strength reinforcement onto the first plate in order to reinforce strength of the first plate;

assembling the component;

sealing an outer wall of the vacuum space to block the vacuum space from an external space;

exhausting internal air of the vacuum space; and providing a device configured to use the vacuum adiabatic body.

11. The method for manufacturing a vacuum adiabatic body of claim 10, wherein the strength reinforcement reinforces the strength of the first plate in the sealing of the outer wall of the vacuum space.

12. A vacuum adiabatic body comprising:

a first plate;

a second plate;

a vacuum space disposed between the first plate and the second plate, and configured to be provided in a vacuum state;

a support disposed inside the vacuum space to maintain the vacuum space; and a strength reinforcement disposed on the first plate to reinforce strength.

13. The vacuum adiabatic body of claim 12, wherein the support is aligned with the first plate in a thickness direction of the vacuum space, and wherein the strength reinforcement is disposed in an area of the first plate corresponding to outside of the support.

14. The vacuum adiabatic body of claim 12, wherein the support is aligned with the first plate in a thickness direction of the vacuum space, and the strength reinforcement is provided in an area of the first plate corresponding to inside of a grid of the support.

15. The vacuum adiabatic body of claim 12, wherein the support is aligned with the first plate in a thickness direction of the vacuum space, and the strength reinforcement is provided in an area of the first plate corresponding to a gap between two portions forming the support.

16. The vacuum adiabatic body of claim 12, wherein a major axis of the strength reinforcement is disposed perpendicular to a gap between two portions forming the support.

17. The vacuum adiabatic body of claim 12, wherein the vacuum adiabatic body satisfies at least one of:

a width of the strength reinforcement is shorter than a length of the strength reinforcement, and the width of the strength reinforcement is greater than a width of a seal on the first plate.

18. The vacuum adiabatic body of claim 12, wherein the vacuum adiabatic body satisfies at least one of:

a width of the strength reinforcement is less than a width of a frame forming part of the support, and the width of the strength reinforcement is larger than a thickness of the strength reinforcement.

19. The vacuum adiabatic body of claim 12, wherein a thickness of the strength reinforcement is greater than a thickness of the first plate.

20. The vacuum adiabatic body of claim 12, wherein the vacuum adiabatic body satisfies at least one of:

a length of the strength reinforcement is longer than a gap between two components forming the support, and the length of the strength reinforcement is less than three times the gap between the two components forming the support.

* * * * *